(12) United States Patent
Takeda

(10) Patent No.: US 6,279,117 B1
(45) Date of Patent: Aug. 21, 2001

(54) RECOVERY SUPPORT METHOD FOR RECOVERING FROM FAILURE OF AN EXTERNAL STORAGE DEVICE

(75) Inventor: Kenichi Takeda, Ebina (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/182,439

(22) Filed: Oct. 30, 1998

(30) Foreign Application Priority Data

Oct. 31, 1997 (JP) .................................................. 9-299945

(51) Int. Cl.$^7$ ...................................................... G11C 29/00
(52) U.S. Cl. .................................................. 714/5; 714/15
(58) Field of Search ............................................. 714/2–24

(56) References Cited

U.S. PATENT DOCUMENTS

| | | | |
|---|---|---|---|
| 5,363,502 | * | 11/1994 | Kagimasa et al. . |
| 5,530,801 | * | 6/1996 | Kobayashi . |
| 5,720,026 | * | 2/1998 | Uemura et al. . |
| 5,724,581 | * | 3/1998 | Kozakura . |
| 5,844,919 | * | 12/1998 | Glover et al. . |
| 5,889,935 | * | 3/1999 | Ofek et al. . |

* cited by examiner

*Primary Examiner*—Paul R. Myers
(74) *Attorney, Agent, or Firm*—Antonelli, Terry, Stout & Kraus, LLP

(57) ABSTRACT

A method is provided for supporting recovery processing from a failure of a storage device in a computer system. The computer system includes a processing unit and a storage device, and in which a batch job consisting of a plurality of jobs is executed on said processing unit. Transition history information which includes information concerned with executed jobs and information concerned with an operated on data-set is obtained during execution of a batch job. At the time of recovery processing in the event of a storage device failure, the transition history information is inspected. Jobs that have performed an output operation to a failed storage device, re-execution of which is required for recovery processing, are extracted as direct re-execution jobs. Further, jobs on which a data-set operation is effected by the direct re-execution jobs are extracted as indirect re-execution jobs. Then, a transition of the data-set operation performed in a batch job is inspected. On the basis of the results of inspection, a data-set and generation of a data-set to be restored from a backup, and the need for deletion of a data-set and a method and timing thereof are determined. Then, information that is used for supporting the recovery operation is edited by using these results and the edited information is outputted as documents.

11 Claims, 22 Drawing Sheets

FIG.4

| JOB NAME | DATA-SET NAME | GENERATION MANAGEMENT CLASS | GENERATION NUMBER | DATA-SET OPERATION ENDING TIME | OPERATION CLASS | NUMBER OF STORAGE MEDIA | STORAGE MEDIUM ID |
|---|---|---|---|---|---|---|---|
| A | C1 | | | 08:10:30 | INPUT | 2 | VSN1, VSN2 |
| A | A2 | | | 08:10:31 | OUTPUT | 1 | VSN3 |
| B | X | | | 08:29:10 | INPUT | 1 | VSN3 |
| B | A2 | | | 08:29:11 | INPUT | 1 | VSN3 |
| B | A1 | GENERATION | +1 | 08:29:11 | OUTPUT | 1 | VSN4 |
| B | B1 | | | 08:29:12 | OUTPUT | 1 | VSN1 |
| ⋮ | ⋮ | ⋮ | ⋮ | ⋮ | ⋮ | ⋮ | ⋮ |
| D | X | | | 10:00:02 | DELETE | 1 | VSN3 |

FIG.5

| JOB NAME | JOB STARTING TIME | JOB ENDING TIME | RE-EXECUTION INDICATION |
|---|---|---|---|
| A | 08:08 | 08:13 | |
| B | 08:13 | 08:32 | |
| C | 08:32 | 09:31 | |
| D | 09:31 | 10:01 | |

FIG.6

| DATA-SET NAME 61 | GENERATION MANAGEMENT CLASS 62 | GENERATION NUMBER 63 | OPERATION CLASS 64 | JOB NAME 65 | JOB STARTING TIME 66 | DATA-SET OPERATION ENDING TIME 67 | NUMBER OF STORAGE MEDIA 68 | STORAGE MEDIUM ID 69 | RE-EXECUTION RELATION INDICATION 70 | DELETION NECESSITY 71 | DELETION METHOD 72 | RESTORATION GENERATION NUMBER 73 | RESTORATION INDICATION 74 |
|---|---|---|---|---|---|---|---|---|---|---|---|---|---|
| A1 | GENERATION | +1 | OUTPUT | B | 08:13 | 08:29:11 | 1 | VSN4 | | | | | |
| A1 | GENERATION | +1 | INPUT | D | 09:31 | 10:00:00 | 1 | VSN4 | | | | | |
| A2 | | | OUTPUT | A | 08:08 | 08:10:31 | 1 | VSN3 | | | | | |
| A2 | | | INPUT | B | 08:13 | 08:29:11 | 1 | VSN3 | | | | | |
| A2 | | | DELETE | D | 09:31 | 10:00:01 | 1 | VSN3 | | | | | |
| B1 | | | OUTPUT | B | 08:13 | 08:29:12 | 1 | VSN1 | | | | | |
| B1 | | | INPUT | C | 08:32 | 09:29:17 | 1 | VSN1 | | | | | |
| B1 | | | DELETE | C | 08:32 | 09:29:17 | 1 | VSN1 | | | | | |
| C1 | | | INPUT | A | 08:08 | 08:10:30 | 2 | VSN1, VSN2 | | | | | |
| C1 | | | DELETE | C | 08:32 | 09:10:30 | 2 | VSN1, VSN2 | | | | | |
| C1 | | | OUTPUT | C | 08:32 | 09:30:06 | 1 | VSN2 | | | | | |
| X | | | INPUT | B | 08:13 | 08:29:10 | 1 | VSN3 | | | | | |
| X | | | DELETE | D | 09:31 | 10:00:02 | 1 | VSN3 | | | | | |

| JOB NAME (41) | DATA-SET NAME (42) | OPERATION CLASS (46) | STORAGE MEDIUM ID (48) |
|---|---|---|---|
| A | C1 | INPUT | VSN1,VSN2 |
| A | A2 | OUTPUT | VSN3 |
| B | X | INPUT | VSN3 |
| B | A2 | INPUT | VSN3 |
| B | A1 | OUTPUT | VSN4 |
| B | B1 | OUTPUT | VSN1 |
| C | B1 | INPUT | VSN1 |
| C | B1 | DELETE | VSN1 |
| C | C1 | DELETE | VSN1,VSN2 |
| C | C1 | OUTPUT | VSN2 |
| D | A1 | INPUT | VSN4 |
| D | A2 | DELETE | VSN3 |
| D | X | DELETE | VSN3 |

| JOB NAME (51) | RE-EXECUTION INDICATION (54) |
|---|---|
| A | |
| B | DIRECT RE-EXECUTION |
| C | |
| D | |

| DATA-SET NAME | GENERATION MANAGEMENT CLASS | GENERATION NUMBER | OPERATION CLASS | JOB NAME | STORAGE MEDIUM ID | RE-EXECUTION RELATION INDICATION |
|---|---|---|---|---|---|---|
| A1 | GENERATION | +1 | OUTPUT | B | VSN4 | |
| A1 | GENERATION | +1 | INPUT | D | VSN4 | |
| A2 | | | OUTPUT | A | VSN3 | |
| A2 | | | INPUT | B | VSN3 | |
| A2 | | | DELETE | D | VSN3 | |
| B1 | | | OUTPUT | B | VSN1 | |
| B1 | | | INPUT | C | VSN1 | |
| B1 | | | DELETE | C | VSN1 | |
| C1 | | | INPUT | A | VSN1,VSN2 | |
| C1 | | | DELETE | C | VSN1,VSN2 | |
| C1 | | | OUTPUT | C | VSN2 | |
| X | | | INPUT | B | VSN3 | |
| X | | | DELETE | D | VSN3 | |

FIG. 13

| JOB NAME | DATA-SET NAME | OPERATION CLASS | STORAGE MEDIUM ID |
|---|---|---|---|
| A | C1 | INPUT | VSN1,VSN2 |
| A | A2 | OUTPUT | VSN3 |
| B | X | INPUT | VSN3 |
| B | A2 | INPUT | VSN3 |
| B | A1 | OUTPUT | VSN4 |
| B | B1 | OUTPUT | VSN1 |
| C | B1 | INPUT | VSN1 |
| C | B1 | DELETE | VSN1 |
| C | C1 | DELETE | VSN1,VSN2 |
| C | C1 | OUTPUT | VSN2 |
| D | A1 | INPUT | VSN4 |
| D | A2 | DELETE | VSN3 |
| D | X | DELETE | VSN3 |

| JOB NAME | RE-EXECUTION INDICATION |
|---|---|
| A | EXAMINING EFFECT |
| B | DIRECT RE-EXECUTION |
| C | |
| D | |

| DATA-SET NAME | GENERATION MANAGEMENT CLASS | GENERATION NUMBER | OPERATION CLASS | JOB NAME | STORAGE MEDIUM ID | RE-EXECUTION RELATION INDICATION |
|---|---|---|---|---|---|---|
| A1 | GENERATION | +1 | OUTPUT | B | VSN4 | |
| A1 | GENERATION | +1 | INPUT | D | VSN4 | |
| A2 | | | OUTPUT | A | VSN3 | |
| A2 | | | INPUT | B | VSN3 | |
| A2 | | | DELETE | D | VSN3 | |
| B1 | | | OUTPUT | B | VSN1 | |
| B1 | | | INPUT | C | VSN1 | |
| B1 | | | DELETE | C | VSN1 | |
| C1 | | | INPUT | A | VSN1,VSN2 | |
| C1 | | | DELETE | C | VSN1,VSN2 | |
| C1 | | | OUTPUT | C | VSN2 | |
| X | | | INPUT | B | VSN3 | |
| X | | | DELETE | D | VSN3 | |

FIG.15

| JOB NAME | DATA-SET NAME | OPERATION CLASS | STORAGE MEDIUM ID |
|---|---|---|---|
| A | C1 | INPUT | VSN1,VSN2 |
| A | A2 | OUTPUT | VSN3 |
| B | X | INPUT | VSN3 |
| B | A2 | INPUT | VSN3 |
| B | A1 | OUTPUT | VSN4 |
| B | B1 | OUTPUT | VSN1 |
| C | B1 | INPUT | VSN1 |
| C | B1 | DELETE | VSN1 |
| C | C1 | DELETE | VSN1,VSN2 |
| C | C1 | OUTPUT | VSN2 |
| D | A1 | INPUT | VSN4 |
| D | A2 | DELETE | VSN3 |
| D | X | DELETE | VSN3 |

| JOB NAME | RE-EXECUTION INDICATION |
|---|---|
| A | INDIRECT RE-EXECUTION |
| B | DIRECT RE-EXECUTION |
| C | INDIRECT RE-EXECUTION |
| D | |

| DATA-SET NAME | GENERATION MANAGEMENT CLASS | GENERATION NUMBER | OPERATION CLASS | JOB NAME | STORAGE MEDIUM ID | RE-EXECUTION RELATION INDICATION |
|---|---|---|---|---|---|---|
| A1 | GENERATION | +1 | OUTPUT | B | VSN4 | |
| A1 | GENERATION | +1 | INPUT | D | VSN4 | |
| A2 | | | OUTPUT | A | VSN3 | |
| A2 | | | INPUT | B | VSN3 | |
| A2 | | | DELETE | D | VSN3 | |
| B1 | | | OUTPUT | B | VSN1 | |
| B1 | | | INPUT | C | VSN1 | |
| B1 | | | DELETE | C | VSN1 | |
| C1 | | | INPUT | A | VSN1,VSN2 | |
| C1 | | | DELETE | C | VSN1,VSN2 | |
| C1 | | | OUTPUT | C | VSN2 | |
| X | | | INPUT | B | VSN3 | |
| X | | | DELETE | D | VSN3 | |

FIG.21

| DATA-SET NAME (61) | GENERATION MANAGEMENT CLASS (62) | GENERATION NUMBER (63) | OPERATION CLASS (64) | JOB NAME (65) | STORAGE MEDIUM ID (69) | RE-EXECUTION RELATION INDICATION (70) | DELETION NECESSITY (71) | DELETION METHOD (72) | RESTORATION GENERATION NUMBER (73) | RESTORATION INDICATION (74) |
|---|---|---|---|---|---|---|---|---|---|---|
| A1 | GENERATION | +1 | OUTPUT | B | VSN4 | RELATED | | | +0 | |
| A1 | GENERATION | +1 | INPUT | D | VSN4 | | | | | |
| A2 | | | OUTPUT | A | VSN3 | RELATED | | | | |
| A2 | | | INPUT | B | VSN3 | RELATED | | | | |
| A2 | | | DELETE | D | VSN3 | | NECESSARY | AFTER RE-EXECUTION | | |
| B1 | | | OUTPUT | B | VSN1 | RELATED | | | | |
| B1 | | | INPUT | C | VSN1 | RELATED | | | | |
| B1 | | | DELETE | C | VSN1 | RELATED | NECESSARY | AFTER RE-EXECUTION | | |
| C1 | | | INPUT | A | VSN1,VSN2 | RELATED | | | | |
| C1 | | | DELETE | C | VSN1,VSN2 | RELATED | | | | |
| C1 | | | OUTPUT | C | VSN2 | RELATED | | | | |
| X | | | INPUT | B | VSN3 | RELATED | NECESSARY | AFTER RE-EXECUTION | | NECESSARY |
| X | | | DELETE | D | VSN3 | | | | | |

FIG.22

| | | | | |
|---|---|---|---|---|
| TITLE = RE-EXECUTION JOB LIST | | | FAILURE STORAGE DEVICE = VSN4 | |
| STANDARD DATE = aaaa.bb.cc dd:ee ~ ffff.gg.hh ii:mm | | | | |
| RE-EXECUTION ORDER | RE-EXECUTION JOB NAME | REQUIRED TIME | TOTAL REQUIRED TIME | |
| 1 | A | 0 h 5 m | 0 h 5 m | 11 |
| 2 | B | 0 h 19 m | 0 h 24 m | |
| 3 | C | 0 h 59 m | 1 h 23 m | |

| | | | | | |
|---|---|---|---|---|---|
| TITLE = GENERATION INFORMATION COLLECTING LIST | | | | FAILURE STORAGE DEVICE = VSN4 | |
| STANDARD DATE = aaaa.bb.cc dd:ee ~ ffff.gg.hh ii:mm | | | | | |
| RE-EXECUTION JOB NAME | DATA-SET NAME | OPERATION CLASS | OPERATION GENERATION NUMBER | NEWEST GENERATION NUMBER | RESTORATION GENERATION NUMBER |
| B | A1 | OUTPUT | G0001V01 | G0001V01 | -0 |

12

| | | | | |
|---|---|---|---|---|
| TITLE = RESTORATION DATA-SET LIST | | | FAILURE STORAGE DEVICE = VSN4 | |
| STANDARD DATE = aaaa.bb.cc dd:ee ~ ffff.gg.hh ii:mm | | | | |
| DATA-SET NAME | RE-EXECUTION JOB NAME | DELETE/UPDATE JOB NAME | DELETE/UPDATE STORAGE DEVICE ID | 13 |
| X | B | D | VSN3 | |

| | | | | |
|---|---|---|---|---|
| TITLE = DELETION DATA-SET LIST | | | FAILURE STORAGE DEVICE = VSN4 | |
| STANDARD DATE = aaaa.bb.cc dd:ee ~ ffff.gg.hh ii:mm | | | | |
| DATA-SET NAME | DELETION JOB | RELATION TO RE-EXECUTION | DELETION METHOD | 14 |
| A2 | D | YES | AFTER RE-EXECUTION | |
| X | D | YES | AFTER RE-EXECUTION | |

FIG.23

TITLE = RE-EXECUTION JOB    FAILURE STORAGE DEVICE = VSN4
         DATA-SET OPERATION LIST
STANDARD DATE = aaaa.bb.cc dd:ee ~ ffff.gg.hh ii:mm

| JOB NAME | OPERATION CLASS | DATA-SET OPERATION ENDING TIME | DATA-SET NAME | GENERATION CLASS | GENERATION NUMBER | STORAGE MEDIUM ID |
|---|---|---|---|---|---|---|
| A | INPUT | 8:10:30 | C1 | - | - | VSN1 |
|   |       |         |    |   |   | VSN2 |
|   | OUTPUT | 8:10:31 | A2 | - | - | VSN3 |
| B | INPUT | 8:29:10 | X | - | - | VSN3 |
|   | INPUT | 8:29:11 | A2 | - | - | VSN3 |
|   | OUTPUT | 8:29:11 | A1 | GENERATION | G0001V01 | VSN4 |
|   | OUTPUT | 8:29:12 | B1 | - | - | VSN1 |
| C | INPUT | 9:30:05 | B1 | - | - | VSN1 |
|   | DELETE | 9:30:06 | B1 | - | - | VSN1 |
|   | DELETE | 9:30:06 | C1 | - | - | VSN1 |
|   |        |         |    |   |   | VSN2 |
|   | OUTPUT | 9:30:07 | C1 | - | - | VSN2 |

FIG.24

TITLE = DATA-SET OPERATION RELATION TABLE
FAILURE STORAGE DEVICE = VSN4
STANDARD DATE = aaaa.bb.cc dd:ee ~ ffff.gg.hh ii:mm

— 16

| DATA-SET NAME | JOB NAME | OPERATION CLASS | DATA-SET OPERATION ENDING TIME | GENERATION CLASS | GENERATION NUMBER | RESTORATION GENERATION NUMBER | STORAGE MEDIUM ID | DELETION NECESSITY | DELETION METHOD | RESTORATION INDICATION |
|---|---|---|---|---|---|---|---|---|---|---|
| A1 | ○B | OUTPUT | 8:29:11 | GENERATION | G0001V01 | -0 | VSN4 | - | - | - |
|  | D | INPUT | 10:00:00 | GENERATION | G0001V01 | - | VSN4 | - | - | - |
| A2 | ☆A | OUTPUT | 8:10:31 | - | - | - | VSN3 | - | - | - |
|  | ○B | INPUT | 8:29:11 | - | - | - | VSN3 | - | - | - |
|  | D | DELETE | 10:00:01 | - | - | - | VSN3 | NECESSARY | - | - |
| B1 | ○B | OUTPUT | 8:29:12 | - | - | - | VSN1 | - | - | - |
|  | ☆C | INPUT | 9:30:05 | - | - | - | VSN1 | - | - | - |
|  | ☆C | DELETE | 9:30:06 | - | - | - | VSN1 | - | - | - |
| C1 | ☆A | INPUT | 8:10:30 | - | - | - | VSN1 | - | - | - |
|  |  |  |  |  |  |  | VSN2 |  |  |  |
|  | ☆C | DELETE | 9:30:06 | - | - | - | VSN1 | - | - | - |
|  |  |  |  |  |  |  | VSN2 |  |  |  |
| X | ○B | INPUT | 8:29:10 | - | - | - | VSN3 | - | - | NECESSARY |
|  | D | DELETE | 10:00:02 | - | - | - | VSN3 | NECESSARY | AFTER | - |

RECOVERY SUPPORT METHOD FOR RECOVERING FROM FAILURE OF AN EXTERNAL STORAGE DEVICE

BACKGROUND OF THE INVENTION

This invention relates to a method for supporting recovery from a failure of a storage device in a computer system where a batch job is executed.

Generally, a batch job is executed on a computer system collectively processing a large quantity of data. The minimum data-set required for re-execution of jobs is retained on media, such as a magnetic tape. However, for reducing operation loads, for shortening the operation time, and for saving resources, such as a magnetic disk or a magnetic tape, a great part of a data-set is deleted or remains in external storage devices after processing.

After occurrence of a failure in the external storage device, in general, it is impossible to confirm the record contents of the external storage device. In order to select a procedure for recovering the external storage device, therefore, it is necessary to pursue a job control language (JCL) list that represents an execution history of a batch job or a list of the assignment medium of the data-set and comprehensively grasp the relationship between an input-output data-set among plural jobs. Because, ordinarily, such processing is performed by a person, there are the following problems. First, if an error arises halfway in pursuit and arrangement, it might be mistaken in a grasp of the relationship between an executed job and the transition of a data-set after that. Accordingly, if a failure occurs after execution of a lot of jobs, it is substantially impossible to recover from the failure. Secondly, it is typical for the backup of the contents of external storage devices to be applied to a magnetic tape in a predetermined cycle in order to use it for recovery when a failure has occurred. However, the contents of external storage devices at a time of failure are changed from the contents present at the time of backup which are acquired because of execution of a batch job. As a result, if the contents in external storage devices are restored by using a backup tape, data-set having the same name is created plural times, or a data-set that has been deleted is restored. These factors cause recovery from a failure to be delayed. If a backup is acquired for a unit of a necessary data-set to resolve these problems, this is a cause of the operation time to linger and a cause of increasing operation load and/or a worsening of the maintainability at a time of addition and/or a change of the data-set and job. Further, procedures, such as pursuing a transition of the data-set which is changed by executing a batch job and grasping a correlation among a plurality of jobs cannot be omitted. Therefore, there is little contribution to the shortening of the recovery time.

SUMMARY OF THE INVENTION

It is an object of the present invention to ensure that recovery from a failure of an external storage device can be easily realized regardless of the executed number of jobs.

To achieve the above object, the present invention provides a method for supporting a recovery from a failure of a storage device in a computer system, where a batch job is executed on a central processing unit, and input, output and deletion of a data-set at the storage device are performed as a result of execution of the batch job. According to the present invention, for each executed job, a data-set operated on by the jobs and the operation type thereof are inspected on the basis of information that concerns executed jobs and a data-set operated on by these jobs included in transition history information acquired with execution of the batch job. As a result of the inspection, jobs that should be executed in re-execution processing are extracted as direct re-execution jobs. As to a respective data-set which has been operated on by a job extracted as a direct re-execution job, an operation type of the operation by the job extracted as a direct re-execution job and an operation type of the operation by other jobs are inspected. As a result of this inspection, a job that is necessary for execution of a direct re-execution job is executed as an indirect re-execution job. On each data-set that has been operated on by a job extracted as a direct re-execution job or a job extracted as an indirect re-execution job and that is managed in generation, a restoration generation number for each operation of the data-set is determined on the basis of the final generation of the data-set and generation of the data-set in the relevant data-set operation. Then, as to a data-set that has been finally deleted, it is inspected whether or not the data-set has been operated on by a job extracted as a direct re-execution job or a job extracted as an indirect re-execution job, and whether or not storage devices that store the data-set include a failed storage device. The manner and timing of deletion of the data-set are determined in accordance with a result of this inspection. Further, the operation history for each data-set that has been operated on by a job that is either a job extracted as a direct re-execution job or a job extracted as an indirect re-execution job is inspected. Based on a result of this inspection, a data-set to be individually restored from a backup in advance of re-execution of the jobs extracted as a direct re-execution job and as an indirect re-execution job are determined. Thereafter, in accordance with the results of such processing, information required to recover the failed storage device is outputted.

In one preferable embodiment of the present invention, the method includes a step of generating a job—data-set table that stores information relating to a data-set for respective jobs, a job information table that stores information relating to execution of respective jobs as a batch job, and a data-set operation table that stores, for respective data-set operations, information relating to the data-set operation. Each processing for the extraction of a direct re-execution job, the extraction of an indirect re-execution job, the determination of a restoration generation number for a data-set, the determination of the manner and timing of deletion of a data-set, and the determination of a data-set to be restored are executed by referring to at least one of the job—data-set table, job information table, and data-set operation table.

In the step of extracting a direct re-execution job, more specifically, a job that has outputted a data-set, which has not been deleted by any succeeding jobs, to the failed storage device is extracted as a direct re-execution job.

The step of extracting an indirect re-execution job is preferably carried out as follows. On the basis of information relating to an operation to a data-set that has been inputted or outputted by a job extracted as a direct re-execution job, as to each data-set to which an input operation has been performed by the direct re-execution job, the operation type of each operation that has been done before or after the input operation to a data-set having the same name and the same generation with the data-set is inspected. If at least one output operation has been performed before the input operation and if a deletion operation has been performed after the input operation, a job that has executed an output operation lastly before the input operation is extracted as an indirect re-execution job. If output operations have been performed before and after the input operation, a job that has executed an output operation lastly before the input operation and a job that has executed the last output operation are extracted as an indirect re-execution job. If no output operation has been performed before the input operation and if at least one output operation has been performed after the input operation and the data-set outputted by the output operation has not been deleted, a job that has executed an output operation lastly is extracted as an indirect re-execution job. Further, as to each data-set on which an output operation has been performed by a job extracted as a direct re-execution job, a data-set operation on a data-set having the same data-set name and the same generation with the data-set is inspected. If any other output operation that has been performed after the relevant output operation exists and if the data-set having the same name and the same generation has not been deleted, a job that has executed an output operation lastly is extracted as an indirect re-execution job.

In the step of determining a restoration generation number, a restoration generation number is determined by determining, as to a respective operation on a data-set that has been operated on by a job extracted as a direct re-execution job or an indirect re-execution job, the difference between a final generation of the data-set and a generation relevant to the operation under inspection.

In the step of determining the manner and timing of deletion, each data-set that has not been operated on by a job extracted as a direct re-execution job or an indirect re-execution job, that has been outputted into the failed storage device, and that has been finally deleted, is determined to be a data-set that can be deleted immediately. On the other hand, data-set that has been operated on by a job extracted as a direct re-execution job or an indirect re-execution job and that has been finally deleted is determined to be a data-set that can be deleted after re-execution.

In the step of determination of a data-set to be restored, the operation type of respective operations on a data-set are inspected in every generation of each data set. Then, a data-set related to an input operation is determined to be a data-set to be restored when neither the output operation nor the deletion operation has been performed before the input operation and at least one of the output and deletion operations has been performed after the input operation.

A further understanding of the nature and advantages of the invention herein may be realized by reference to the remaining portions of this specification and the attached drawings

BRIEF DESCRIPTION OF THE DRAWINGS

FIG. 4 is a table which shows the data structure of a job—data-set table;

FIG. 5 is a table which shows the data structure of a job information table;

FIG. 6 is a table which shows the data structure of a data-set operation table;

FIG. 11 is a table which shows the status after direct re-execution job decision processing;

FIG. 13 is a table which shows the status after discriminating an indirect re-execution job from a direct re-execution job;

FIG. 15 is a table which shows the status of respective tables after indirect re-execution job decision processing;

FIG. 21 is a table which shows an example of a status of a data-set operation table after a processing for determining a necessity for restoration;

FIG. 22 is a diagram which shows examples of document formats of outputted documents that are used for recovery from a failure;

FIG. 23 is a diagram which shows an example of a document format of a re-execution job—data-set operation list FIG. 24 is a diagram which shows an example of document format of a data-set operation list.

DESCRIPTION OF THE PREFERRED EMBODIMENT

Figure 1:
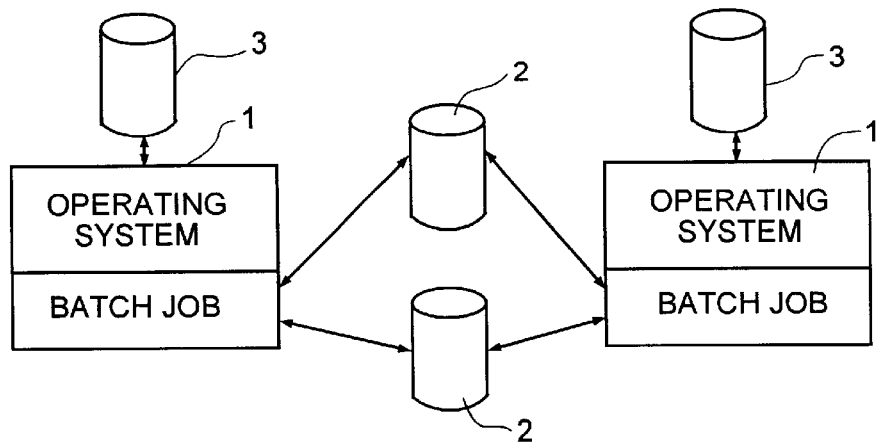
FIG. 1 is a block diagram of a computer system to which the present invention is applied.

FIG. 1 is a block diagram of a computer system to which the present invention is applied. In FIG. 1, the reference numeral 1 denotes a host computer. On the host computer 1, an operating system is executed, and, under control of the operating system, a batch job that consists of a plurality of jobs is executed. The reference numeral 2 denotes a storage device that is, for example, representative of a magnetic disk storage apparatus. The storage device 2 is used for a batch job and stores data-sets that are inputted, outputted, and deleted during execution of the batch job. The reference numeral 3 denotes a storage device in which, following execution of a batch job, data-set information and job information are acquired as transition history information. The data-set information includes information, for respective data-sets operated in the batch job, such as a job name of a job that operated on the data-set, a name of the data-set, a generation management class, a generation number, a data-set operation ending time and an operation class. The job information includes a job name for each executed job and the starting time and ending time of each job. The operation class of a data-set operation by a job includes three types of operation, i.e. input, output, and deletion. An update is expressed as a combination of a deletion and an output. An operation that adds data to a data-set is expressed as an output. When a failure has occurred in a storage device 2, an alternative storage device is prepared, jobs that need to be re-executed are extracted based on the transition history information acquired from the storage devices 3, and the extracted jobs are re-executed as re-execution jobs to recover the state just before the failure. FIG. 1 shows two host computers 1, two storage devices 2 and two storage devices 3, however, any number of these devices can be applied.

Figure 2:
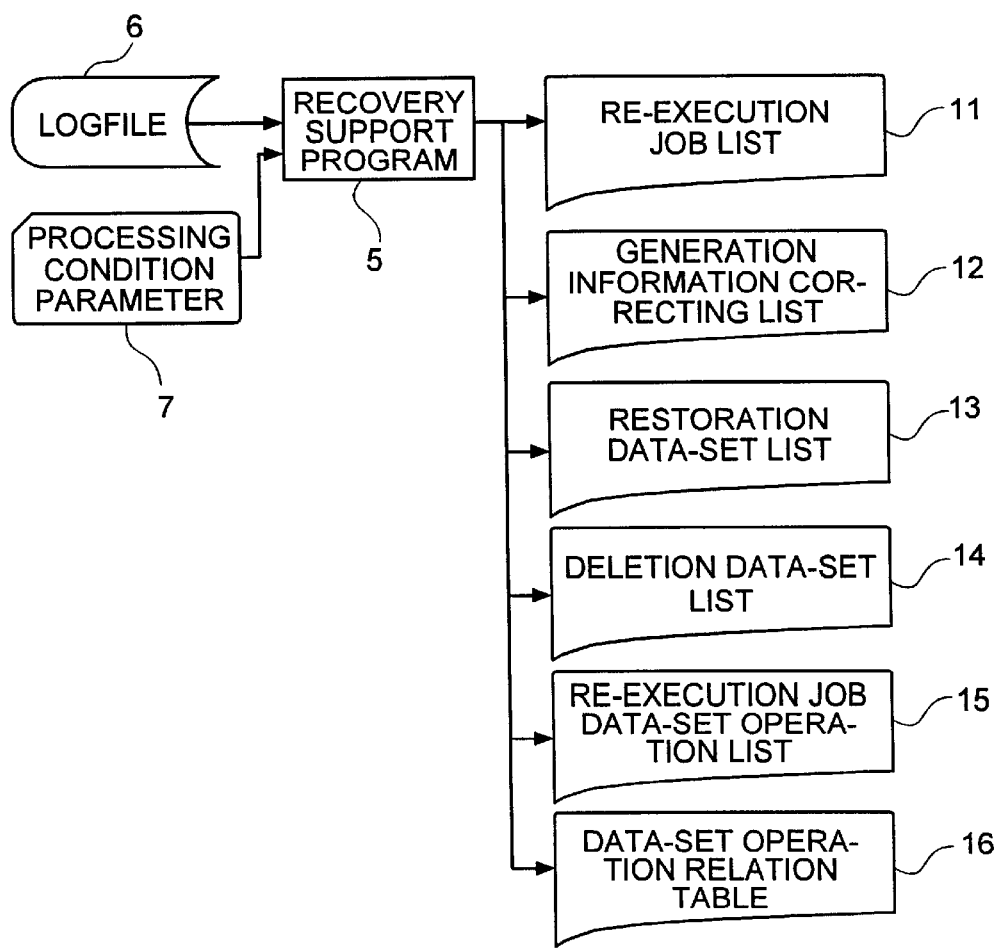
FIG. 2 is a diagram which shows the relation among a recovery support program for supporting recovery processing and information inputted/outputted thereto.

FIG. 2 shows a relation among a recovery support program for supporting recovery processing and information inputted/outputted thereto. In this embodiment, the recovery support program 5 is executed on host computer 1 on which a batch job is executed, however, the recovery program can be executed on another computer system.

Recovery support program 5 outputs documents that are used for supporting recovery from a failure of a storage device 2 on the basis of transition history information 6 stored in storage devices 3 and identification of a failed storage device designated by processing condition parameter 7. The documents include a re-execution job list 11, a generation information correcting list 12, a restoration data-set list 13, and a deletion data-set list 14. Recovery support program 5 also outputs a re-execution job data-set operation list 15 and a data-set operation relation list 16 as documents to support inspection of the propriety of above described documents. As for the disk recovery support program 5, it is possible to store and to distribute it in a storage medium, such as a magnetic tape, a floppy disk and an optical disk. The processing mentioned hereinafter is realized by loading main storage of the host computer 1 with disk recovery support program 5, recorded in these storage media, and executing it.

Figure 3:
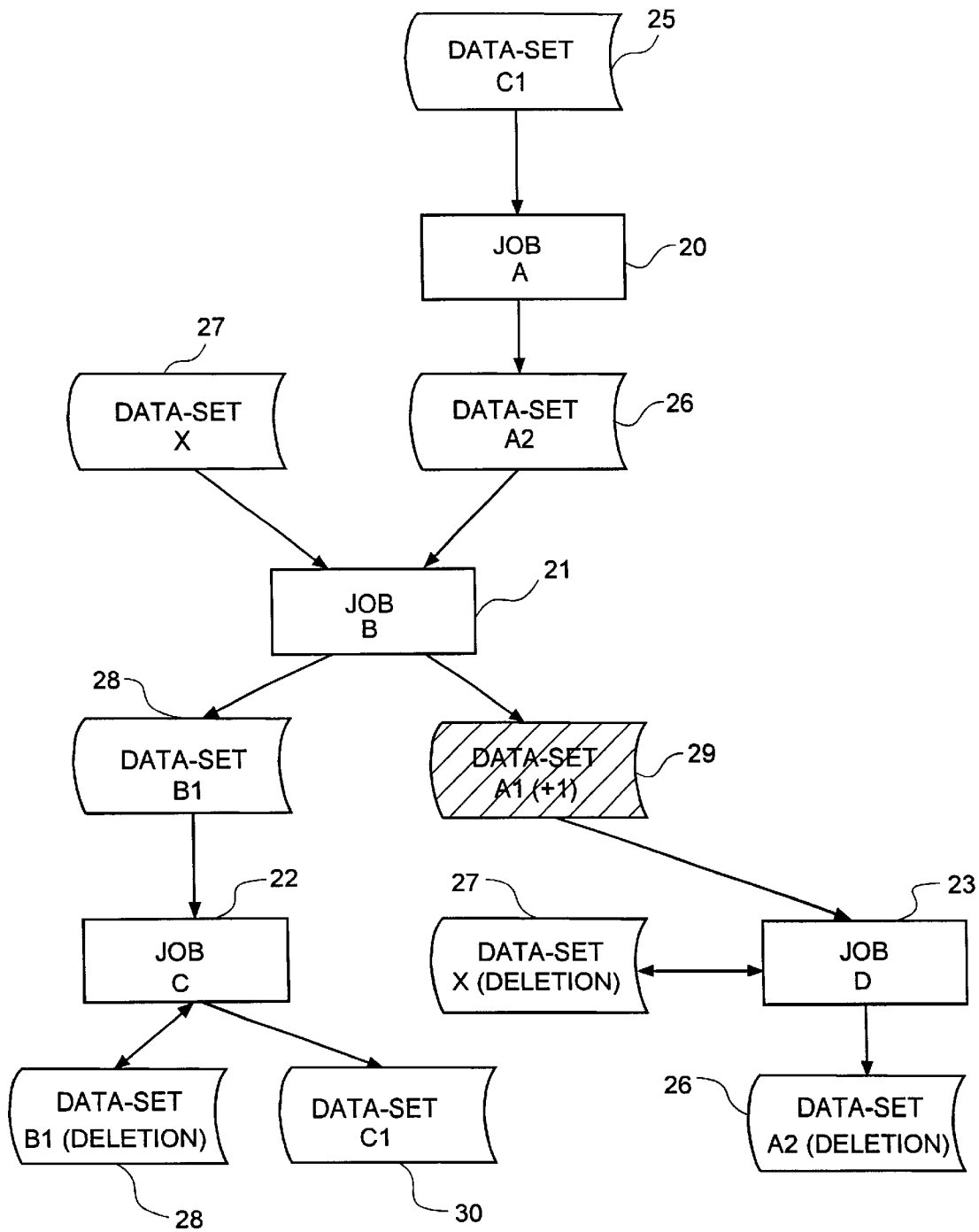
FIG. 3 is a diagram which shows the relation among executed jobs and data-sets in an example of a batch job.

FIG. 3 shows a relation among jobs and data-sets in an example of a batch job. In this figure, 20–23 denote jobs that are executed as a batch job and 25–30 denote data-sets inputted or outputted by jobs 20–23. A Job "A" 20 inputs data-set "C1" 25 and outputs data-set "A2" 26. A Job "B" 21 inputs data-set "A2" 26 and data set "X" 27, outputs data-set "B1" 28, and advances generation of data-set "A1" 29 that is managed in generation and outputs it. A Job "C" 22 inputs and deletes data-set "B1" 28, and deletes data-set "C1" 25 and outputs data-set "C1" 30 afresh. A Job "D" 23 inputs data-set "A1" 29 managed in generation and deletes data-set "A2" 26 and data-set "X" 27. Job A, job B, job C and job D are executed in this order. Although the batch job explained for purposes of this embodiment consists of four jobs to simplify the explanation, the number of jobs is not restricted to four and a batch job might consist of any number of jobs.

FIG. 4 shows the data structure of an job—data-set table created on the basis of the transition history information 6. The job—data-set table 40 has entries for respective data-sets operated on by each job. Each entry has a job name field 41 to which a job name of a job that operated on the data-set is set, a data-set name field 42 to which a name of the operated on data-set is set, a generation management class field 43 to which generation management class information that indicates whether the relevant data-set is managed in generation is set, a generation number field 44 to which a generation number is set if the relevant data-set is managed in generation, a data-set operation ending time field 45 to which an ending time of operation on the relevant data-set is set, an operation class field 46 to which information indicating a type of operation inclusive of input, output, and deletion is set, a storage medium ID field 48 to which an identification of the storage device that stores the relevant data-set is set, and a number of storage media field 47 to which the number of the storage devices that are used for storing the relevant data-set is set.

FIG. 5 shows data structure of a job information table which is created on the basis of the transition history information 6 likewise with the job—data-set table 40. The job information table 50 includes entries for each job that has been executed in a batch job. Each entry has a job name field 51 to which the name of the job that operated on the data-set is set, a job starting time field 52 to which a starting time of the job is set, a job ending time field 53 to which an ending time of the job is set, and a re-execution indication field 54 to which, upon determination of a need for re-execution, re-execution indication information that indicates whether re-execution of a relevant job is necessary or not is set.

FIG. 6 shows the data structure of a data-set operation table. The data-set operation table 60 is created on the basis of the job—data-set table 40 and the job information table 50 where the overall transition history information is expanded. The data-set operation table 60 has entries each of which corresponds to an operation for each data-set. Each entry has a data-set name filed 61, a generation management class 62, a generation number field 63, an operation class field 64, a job name field 65, a job starting time field 66, a data-set operation ending time field 67, a number of the storage media field 68, and a storage device ID field 69 similar to the job—data-set table 40. Each entry of the data-set operation table 60 further includes a re-execution relation indication field 70 in which information indicating that the relevant data-set is related to a job to be re-executed is set, a deletion necessity field 71 in which deletion necessity information indicating that the data-set should be deleted before or after re-execution of re-execution jobs is set, a deletion method field 72 in which deletion method information indicating a manner of deletion of the relevant data-set is set, a restoration generation number field 73 in which information indicating that the relevant data-set should be backed to which generation for revising a JCL definition of a generation data-set prior to execution of re-execution jobs is set, and a restoration indication field 74 to which restoration information, for restoring the data-set individually if the data-set has been inputted by re-execution of a job and has been deleted, is set.

To discriminate a failed storage device, a failed storage device ID table that holds the storage device ID designated by the processing condition parameter is provided in addition to the three tables mentioned above.

Figure 7:
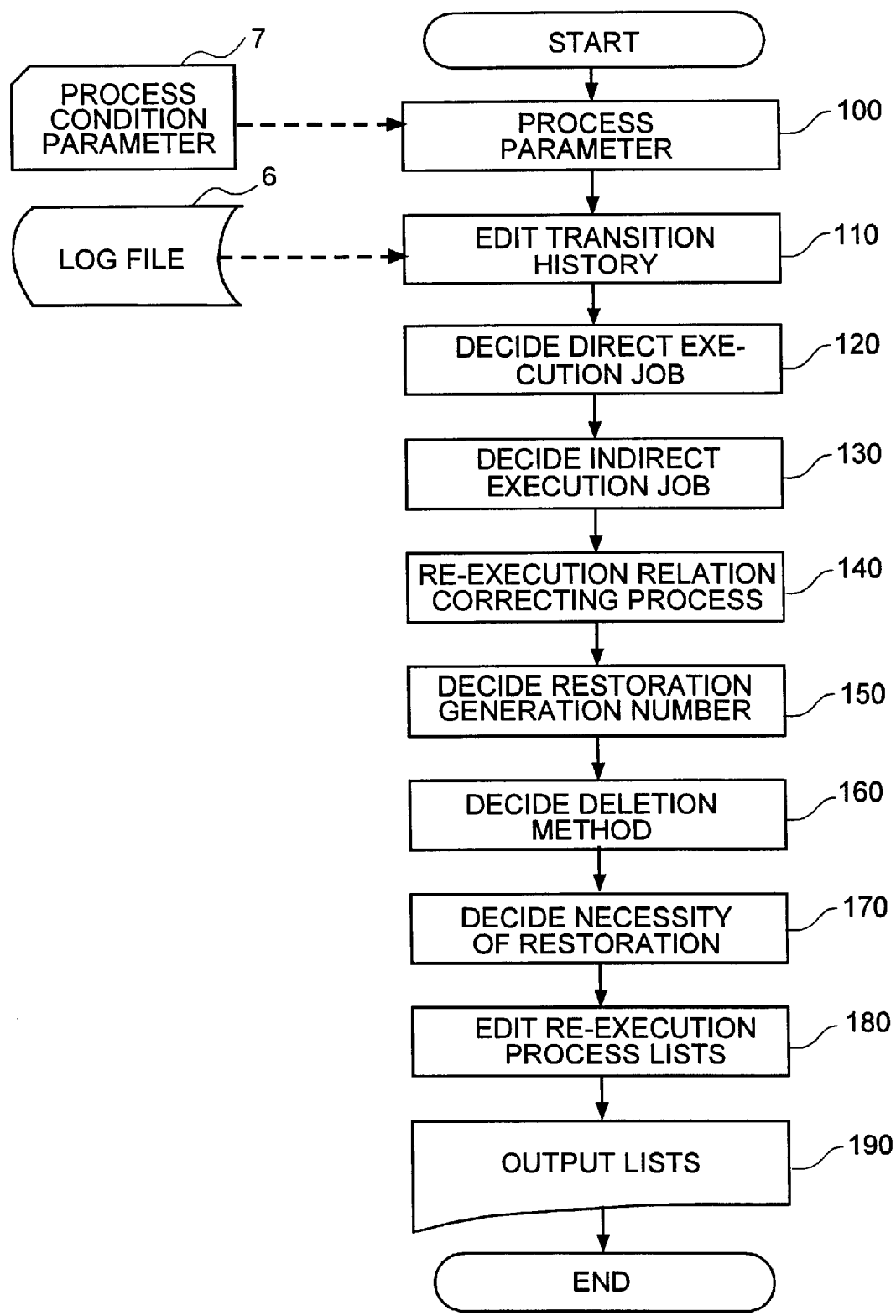
FIG. 7 is a flow chart showing a recovery support processing.

FIG. 7 is a flow chart that shows the processing flow of recovery support processing implemented with the recovery support program 5. In the recovery support processing, first of all, a storage device ID that identifies a failed storage device is set into the failed storage device ID table in accordance with processing parameter 7 (step 100). At step 110, inputted transition history information 6 is analyzed, and a job name, a data-set name, a generation management class, a generation number, a data-set operation ending time, an operation class, the number of the storage devices, a storage device ID, a job starting time, and a job ending time are set to corresponding fields of the job—data-set table 40 and the job information table 50. After analyzing all of the transition history information, the data-set operation table 60 is created, whereby information set in fields of the job—data-set table 40 and the job information table 50 are set to corresponding fields of the data-set operation table 60. The processing order of step 100 and step 110 can be switched. Next, a processing to identify direct re-execution jobs is executed based on the job—data-set table 40, the job information table 50, the data-set operation table 60 and the failed storage device ID table (step 120). Then, indirect re-execution jobs, execution of which are required to execute direct re-execution jobs, and affected indirect re-execution jobs, execution of which are required to execute indirect re-execution jobs, are identified (step 130). After all of the direct re-execution jobs and the indirect re-execution jobs (inclusive or affected indirect re-execution job) are determined, re-execution relation correction processing is executed (step 140). In this processing, re-execution relation information indicating that a data-set is related to a job which needs to be re-executed is determined and set to re-execution relation indication field 70 of the data-set operation table 60. The restoration generation number for generation of data-sets (data-sets managed in generation) defined in the JCL of re-execution jobs are determined at step 150. Then, data-sets should be deleted before or after the execution of re-execution jobs are discriminated, and deletion necessity information and deletion method information, to be set to the deletion necessity indication field 71 and the deletion method field 72 of the data-set table 60, respectively, are determined (step 160). At step 170, if any data-set that is used as an input of a re-execution job has been deleted, it is determined whether the data-set should be restored or not. The result of this determination is reflected in the restoration indication field 74. After information for the respective tables has been determined by the above mentioned processing, referring to these tables, a re-execution job list 11, a generation information correcting list 12, a restoration data-set list 13, a deletion data-set list 14, a re-execution job data-set list 15, and a data-set relation list 16 are outputted (step 190).

The following description includes detailed explanations of the recovery support processing. In the following explanations, variables P1, P2, and P3 will be used as pointers that point to an entry of the job—data-set table 40, an entry of the job information table 50, and an entry of the data-set operation table 60, respectively.

Figure 8:
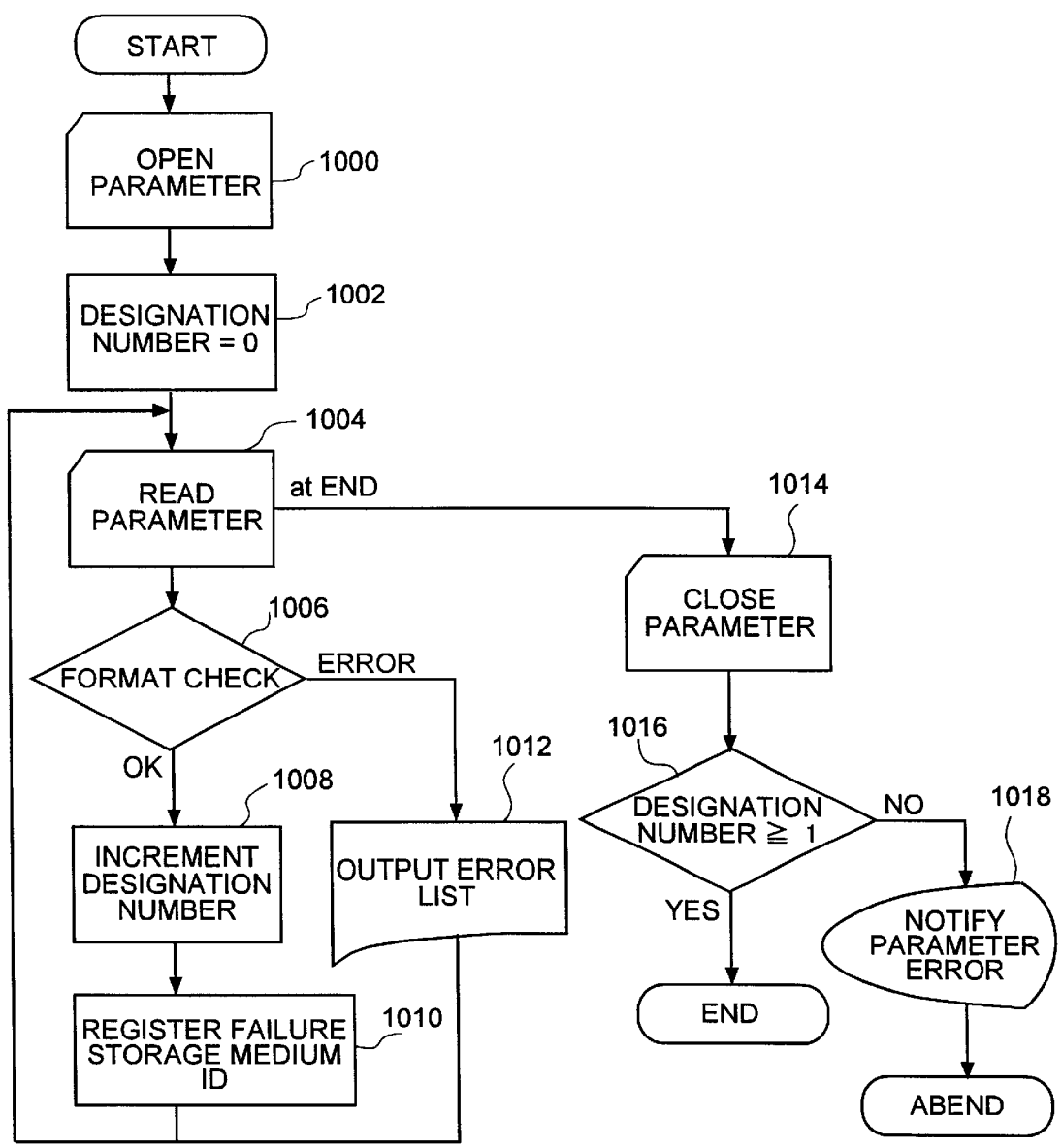
FIG. 8 is a detailed flow chart of a parameter processing.

FIG. 8 is a detailed flow chart of the parameter processing executed at step 100. To begin with, in the parameter processing, a processing condition parameter file is opened (step 1000), then "0" is set to a variable DESIGNATION NUMBER (DN) which indicates the number designation of the storage device ID of the failed storage devices as an initial value (step 1002). By successively reading a processing condition parameter, the processing of steps 1006–1012 are repeatedly executed. After all of the processing condition parameters have been processed, processing is moved to step 1014 from step 1004. At step 1006, a check is made to determine whether the designation of the processing condition parameter satisfies a predetermined rule. If the processing condition parameter is appropriate, the value of DN is increased by one (step 1008), and storage device ID of the failed storage devices is set to entries of the failed storage device ID table corresponding to a value of DN (step 1010). If it is considered that the processing condition parameter is not appropriate at step 1006, an error list is outputted (step 1012).

When the processing is finished for all processing condition parameters, the processing condition parameter file is closed (step 1014). At step 1016, the value of DN is examined. If DN is one or more, it is assumed that valid parameters are designated and the processing steps after step 110 are executed. On the other hand, if DN is "0", then a parameter error is indicated and processing is abnormally terminated. When duplication of a designated storage device ID is found at step 1006, these designations might be considered as one designation.

Figure 9:
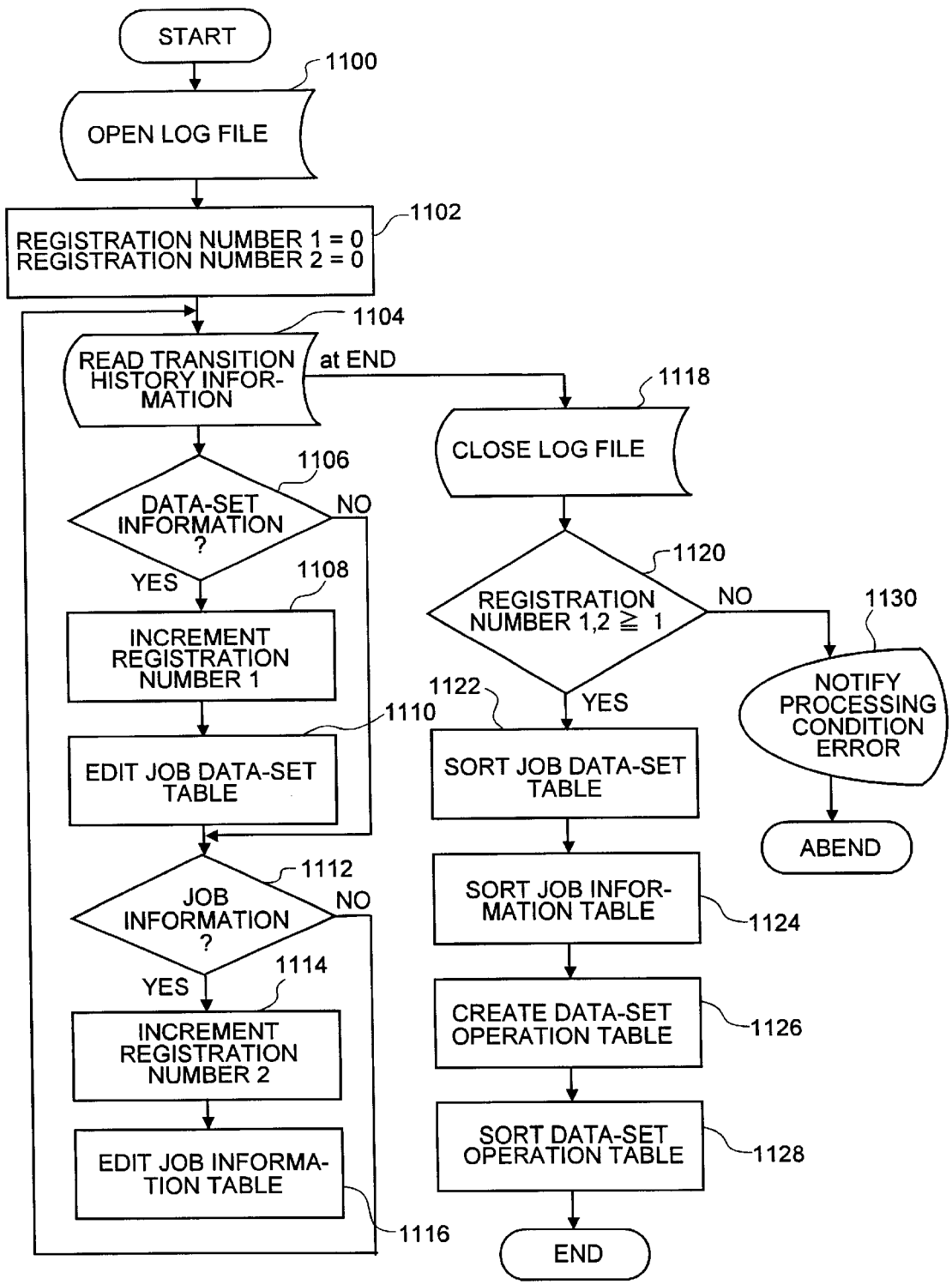
FIG. 9 is a detailed flow chart of a transition history editing processing.

FIG. 9 is a detailed flow chart of the transition history editing processing executed at step 110. In the transition history editing processing, a log file 6 that stores transition history information that is stored in storage devices 3 is opened (step 1100). As initial value, "0" is set to variables REGISTRATION NUMBER 1 (RN1) and REGISTRATION NUMBER 2 (RN2) each of which stores a number of the registered entries of the job—data-set table 40 and the job information table 50, respectively (step 1102). Then, processing steps 1106–1116 are repeatedly executed with a reading of the transition history information. After all of the transition history information has been read and processed, processing is moved to step 1118 from step 1104. At step 1106, it is determined whether or not the transition history information includes information to be stored into the job—data-set table 40. If such information exists, "1" is added to RN1 that indicates the number of the registered information entered into the job—data-set table 40. (step 1108). Then, the information is set to respective fields of the job—data-set table 40. At this time, an initial value is set to the generation number field 44, if the generation management class field 43 indicates that a data-set relevant to the entry is not managed in generation (step 1110). After step 1110 or in the case that information to be stored into the job—data-set table 40 is not included in read transition history information in step 1106, it is determined whether the transition history information includes job information (step 1112). If job information is included, "1" is added to RN2 that indicates the number of the registered job information (step 1114). Then, the job information is set to respective fields of the job information table 50. At this time, job names, a job starting time and a job ending time in the read job information are set to the job name field 51, the job starting time field 52, and the job ending time field 53, respectively. Information indicating that re-execution is not required is set to the re-execution indication field 54 as an initial value (step 1116). After step 1116 or in case the transition history information read at step 1112 does not include job information, processing is returned to step 1104 to read successive transition history information, and the above described processing is repeated.

After all of the transition history information is processed, the log file 6 is closed (step 1118). Then, it is determined whether both of the values of RN1 and RN2 are equal to one or more, namely, whether or not data has been set to both of the job—data-set table 40 and the job information table 50 is determined (step 1120). If both values of RN1 and RN2 are one or more and data has been set to the tables, it is assumed that there is a possibility that information concerned with restoration of a failed storage device is included. In this case, the following processing is further executed. Information registered in the job—data-set table 40 is sorted in an ascending order of the job name, data-set name, generation number, and data-set operation ending time (step 1122). Successively, information registered in the job information table 50 is sorted in an ascending order of the job name and job starting time (step 1124). All information set to the job—data-set table 40 is copied to corresponding fields of the data-set operation table 60. A job name and job starting time set in an entry of the job information table 50, where conditions are such that the job name of the job name field 51 of the entry coincide with a job name of the job name field 41 of the job—data-set table 40 and "job starting time $\leq$ data-set operation ending time $\leq$ job ending time" are satisfied, are set to the job name field 65 and the job starting time field 66 of the data-set operation table 60 (step 1126). Then, the data-set operation table 60 is sorted in an ascending order of the data-set name, generation number, and data-set operation ending time (step 1128). Then, the processing is moved to the step 120 after completion of the above processing. If at least one of the values of RN1 and RN2 is "0" at step 1120, a processing condition parameter error is indicated and processing is abnormally terminated.

Figure 10:
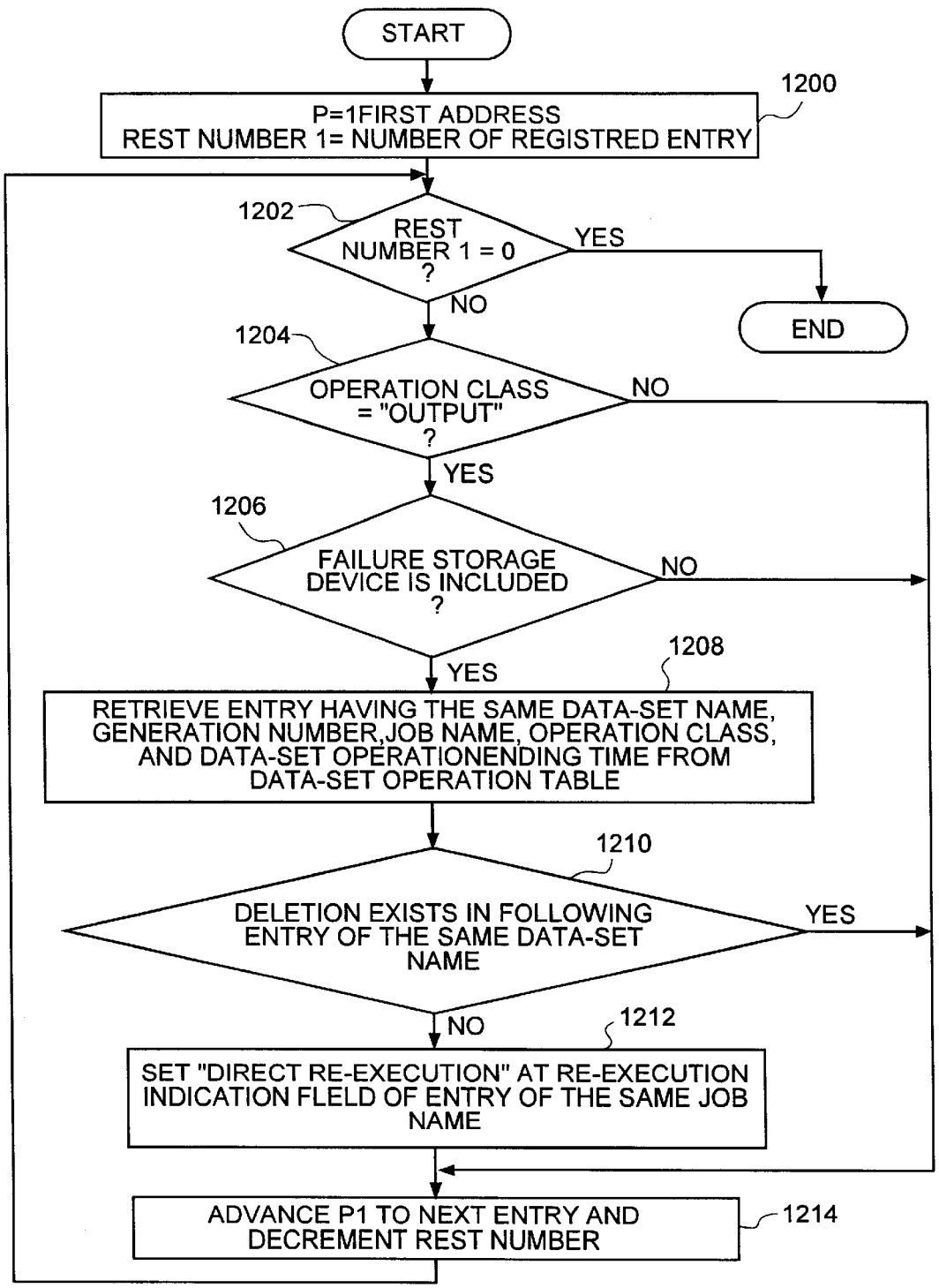
FIG. 10 is a detailed flow chart of processing for deciding direct re-execution jobs.

FIG. 10 is a detailed flow chart of the processing for determining direct re-execution jobs to be executed at step 120. In this embodiment, a job, that has created a data-set, that has been outputted to a failed storage device and has not been deleted by following processing, is identified as a direct re-execution job by this processing.

In this processing, as a preparation for the processing, an address of the first entry of the job—data-set table 40 is set to P1 and a number of registered entries of the job—data-set table 40 is set to a variable of REST NUMBER 1 (REN1) at step 1200. At step 1202, the value of REN1 is examined. If the value is one or more, the processing is continued because all direct re-execution jobs are not fixed. If the value is "0", all entries of the job—data-set table 40 are examined and all of the direct re-execution jobs are identified, therefore this processing is terminated and the processing is moved to step 130. At step 1204, the operation class set in the operation class field 46 of an entry of the job—data-set table 40 pointed to by P1 is examined. If the operation class is "OUTPUT", the storage device ID set in the storage device ID field 48 is compared with the storage device ID set in the failed storage device ID table in order to determine whether the storage device in which the data-set has been stored has failed (step 1206). As a result of this comparison, if coincident storage device ID is stored in the failed storage device ID table, there is a possibility that the job which has executed the relevant output operation would be a re-execution job. In this case, the processing of step 1208 is executed next. At step 1208, in order to determine whether or not a data-set outputted to a failed storage device has been deleted by a succeeding job inclusive of the job which has executed the output operation, retrieval of the entries of the data-set operation table 60 is performed with a data-set name and a generation number as keys. It is determined whether or not an entry with an operation class field 64 having "DELETE" exists in the retrieved entries of the data-set operation table 60 (step 1210). If such an entry exists, the output operation to the failed storage device is considered as invalid at the time of failure. In this case, the processing is moved to step 1214. On the other hand, if no entry with an operation class field 64 having "DELETE" exists, an output operation is required to recover the failed storage device. Therefore, information that indicates direct re-execution is set to the re-execution indication field 54 of an entry of the job information table 50, to which the same job name as the job name set in the job name field 41 of an entry pointed to by P1 in the job—data-set table 40 is set (step 1212). If the result of the determination in step 1204 or step 1206 is negative, it is confirmed that the relevant data-set was deleted at step 1210, or after processing of step 1212, at step 1214, P1 is advanced one entry and REN1 is decreased by one. Then, the processing after step 1202 is repeated.

FIG. 11 shows an example of table status after execution of above mentioned direct re-execution job decision processing. Referring to FIG. 11, the direct re-execution job decision processing will be explained with an example. In this example, it is supposed that a failure has occurred in a storage device (storage device ID is VSN4) which stores generation managed data-set A1. This supposition is also the same in the explanations of other processing in this specification. Here, the columns of each table that do not relate to the explanation are omitted in FIG. 11

At step 1200, P1 points entry 200 of the job—data-set table 40. Thereafter, the entry pointed to by P1 is shifted to a lower entry one by one as the processing advances. When P1 points to entry 202, at step 1204, the operation class is recognized as "OUTPUT", and at step 1206, it is recognized that storage device ID "VSN4" set in the storage device ID field 48 is also set in the failed storage device ID table, so a relevant data-set is stored in a failed storage device. Accordingly, at step 1208, the entry 204 and the entry 205 are retrieved from the data-set operation table 60. It is determined that no entry, the operation class field 64 of which is "DELETE", exists at step 1210. Accordingly, at step 1212, job B is identified as a direct re-execution job and information that indicates direct re-execution is set to the re-execution indication field 54 of an entry relevant to job B in the job information table 50.

Figure 12:
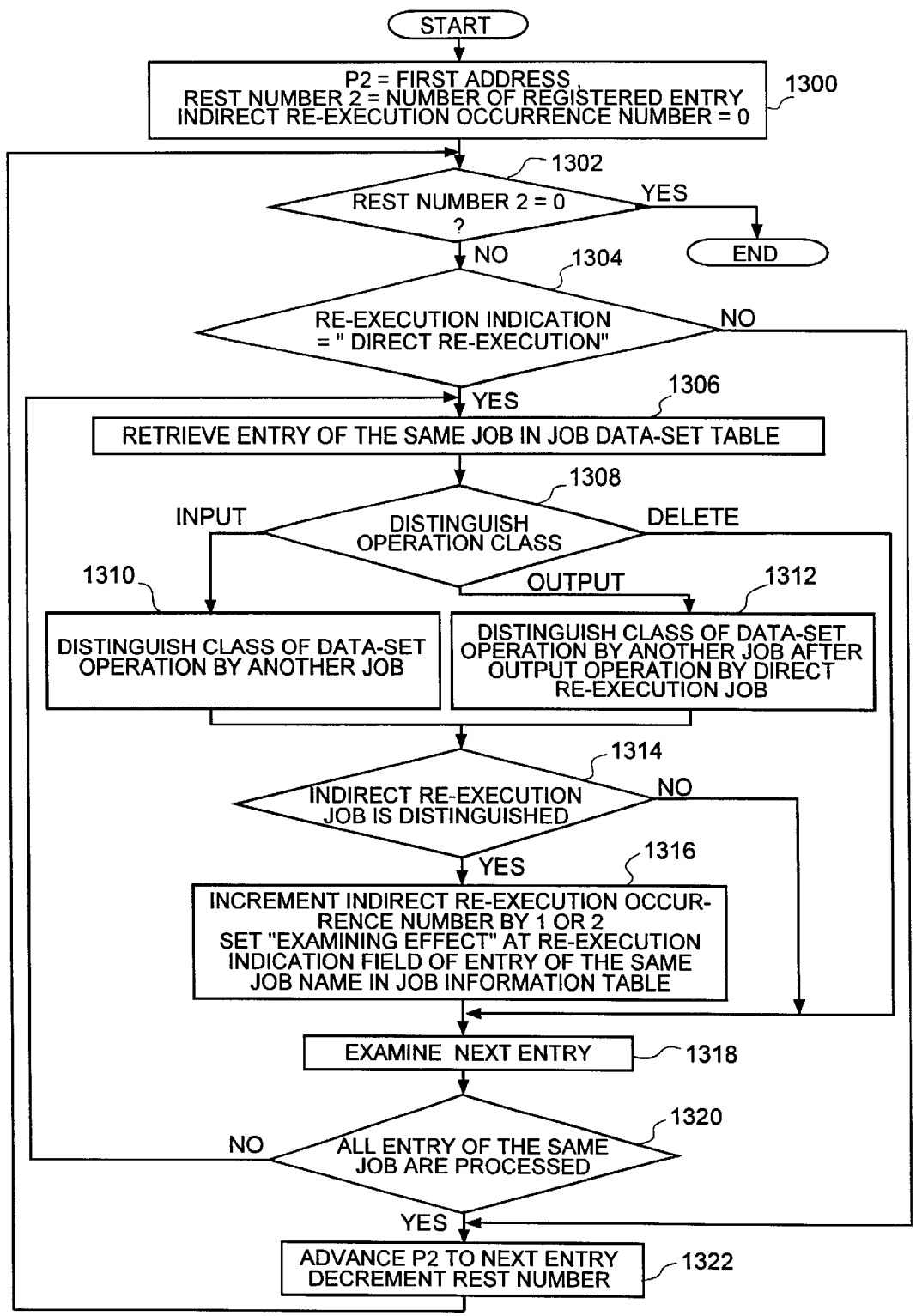
FIG. 12 is a flowchart of the processing for determining an indirect re-execution job from a direct re-execution job in an indirect re-execution job decision processing.

FIG. 12 is a flowchart of the processing for identifying an indirect re-execution job at step 130. When no direct re-execution job can be found at step 120, the processing of step 130 and the steps after step 130 might be skipped. In this processing, at first step 1300, an address of the first entry of the job information table 50 is set to P2, a number of the registered entries of the job information table 50 is set to variable REST NUMBER 2 (REN2), and "0" is set to variable INDIRECT RE-EXECUTION JOB OCCURRENCE NUMBER (RJN). At step 1302, the value of REN 2 is examined. If the value of REN2 is "0", processing for determination of an indirect re-execution job derived from a direct re-execution job is terminated, and the processing is moved to step 140. If the value of REN2 is found to be one or more, as a result of the examination at step 1302, then it is determined whether or not information indicating a direct re-execution is set in the re-execution indication field 54 of the entry pointed to by P2 in the job information table 50 (step 1304). If the information set in the re-execution indication field 54 does not indicate a direct re-execution, it is moved to step 1322. If information indicating direct re-execution is set in the re-execution indication field 54, as a result of the determination in step 1304, a first entry that relates to a data-set operated by a job that has been determined as a direct re-execution job is extracted from the job—data-set table 40 on the basis of information set in the job name field 31, the job starting time field 53, and the job ending time field 54 of the entry pointed to by P2. More specifically, the job—data-set table 40 is referred to in order from the first entry thereof, and a first entry, the data-set operation ending time field 45 of which has an ending time that satisfies the conditions "job starting time ≦ data set operation ending time ≦ job ending time", is retrieved (step 1306). Then, as to the retrieved entry of the job—data-set table 40 at step 1306, the operation class set in the operation class field 46 of the retrieved entry is discriminated (step 1308).

If operation class is "INPUT", then the data-set operation table is referred to with a data-set name, generation number, and an data-set operation ending time as keys, and it is determined whether or not an output operation to the relevant data-set by another job has been performed before or after the input operation by a job identified as a direct re-execution job (such a job is referred to as a direct re-execution job hereafter). If output operations by other jobs existed before and after the input operation by a direct re-execution job, a job which has executed the output operation of the relevant data-set last before the input operation of the relevant data-set by a direct re-execution job and a job which has executed the last output operation to the relevant data-set after the input operation are identified as an indirect re-execution job. At this time, "2" is set to a variable INTERMEDIATE OCCURRENCE NUMBER (ION). If no job which has executed an output operation of the relevant data-set before the input operation by a direct re-execution job exists, and if any job which has executed an output operation of the relevant data-set after an input operation by a direct re-execution job exists, then a job which has executed an output operation of the relevant data-set last is determined to be an indirect re-execution job. At this time, "1" is set to ION. If another job which has executed an output operation before the input operation by a direct re-execution job exists and the relevant data-set has been deleted after the input operation by any job inclusive of a direct re-execution job, a job which has executed an output operation for the relevant data-set last before the input operation by a direct re-execution job is determined to be an indirect re-execution job. "1" is set to ION. If the relevant data-set which has been outputted by another job after an input operation by a direct re-execution job has been finally deleted, however, in this case, a job which has executed an output operation after an input operation by a direct re-execution job is not designated an indirect re-execution job, and no value is added to ION (step 1310).

As a result of a determination at step 1308 when the operation class of the relevant data-set is "OUTPUT", it is determined whether or not an output operation of the relevant data-set by another job executed after an output operation by a direct re-execution job exists without deletion of the relevant data-set. When an output operation by another job exists and the relevant data-set has not been deleted, a job which has executed an output operation of the relevant data-set last is identified as an indirect re-execution job. In this case, "1" is added to ION (step 1312).

After step 1310 or step 1312, at step 1314, the value of ION is checked and it is determined whether or not a job identified as an indirect re-execution job exists. If ION is not "0", in other words, if an indirect re-execution job exists, the job information table 50 is referred to using a name of a job, which has been identified as an indirect re-execution job at step 1310 and/or 1312, and a job starting time as keys. Then, information that indicates under examination of effect is set to the re-execution indication field 54 of the retrieved entries, except for entries with a re-execution indication field 54 to which information indicating direct re-execution is set. Also, in accordance with the value of ION, "1" or "2" is added to RJN and "0" is set to ION to reset it (step 1316). If the operation class is "DELETE" at step 1308, or ION is "0" at step 1314, or after processing of step 1316 is completed, the next entry in the job—data-set table 40 which satisfies the condition used in step 1306 is searched (step 1318). If any entry that satisfies the condition is found, then the processing returns to step 1308, and processing is repeated for the entry, otherwise, the processing is moved to step 1322. At step 1322, P2 is advanced one entry, REN2 is decreased by one, and then, processing after step 1302 is repeated.

FIG. 13 shows the table status after the processing for identifying an indirect re-execution job has been completed. Referring to FIG. 13, the indirect re-execution job decision processing will be explained with an example as follows. When P2 points to entry 208, at step 1304, it is determined that the re-execution indication field 54 of the entry 208 indicates a direct re-execution. As a result, it is known that job B is a direct re-execution job from the job name field 51 of the entry 208. Then, at step 1306, the operation transition of the data-set operated on by job B is determined by referring to entries of the job—data-set table 40, job name field 41 of which stores "B". For the operation on data-set A2 performed by job B, for example, it is known that the operation class thereof is "INPUT" from entry 212. Next, by referring to the data-set operation table 60, it is known that an entry of the data-set operating table 60 corresponding to an entry 212 is an entry 214, an entry 216 that indicates that an output operation performed on the data-set A2 before the input operation of job B exists, and an entry 218 that indicates that a deletion operation performed on the data-set A2 after the input operation of job B exists. Accordingly, at step 1310, job A is identified as an indirect re-execution job from the job name field 65 of the entry 216, and, at step 1316, information indicating under examination of effect (this information is indicated as "EXAMINING EFFECT" in FIG. 13) is set to the re-execution indication field 54 of an entry 220 which corresponds to job A in the job information table 50.

Figure 14:
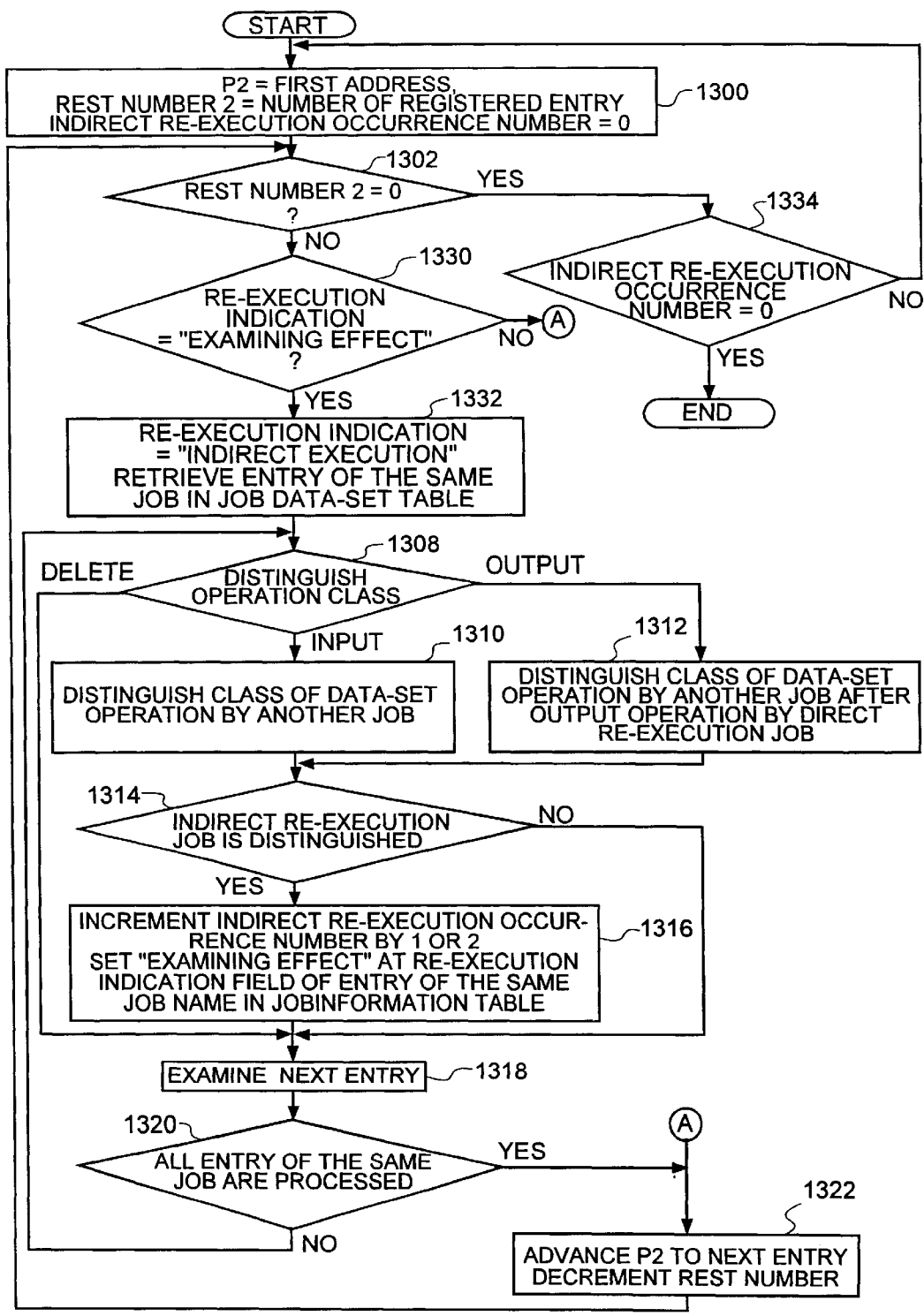
FIG. 14 is a flow chart of processing for determining an affected indirect re-execution job in an indirect re-execution job decision processing.

FIG. 14 is a flow chart of processing for determining an affected indirect re-execution job, which is required to execute an indirect re-execution job inclusive of an affected indirect re-execution job identified in this processing, executed in the indirect re-execution job decision processing at step 130. In the figure, for steps where processing is similar to processing steps which were explained with reference to FIG. 12, the same reference numbers as FIG. 12 are used. In the following, an explanation of those steps is omitted.

In this processing, when the value of REN2 discriminated in step 1302 is one or more, it is determined whether or not "EXAMINING EFFECT" is set in the re-execution indication field 54 of an entry pointed to by P2 in the job information table 50 (step 1330). If "EXAMINING EFFECT" is not set in the re-execution indication field 54, the processing is moved to step 1322 and processing on the next entry is executed. On the other hand, if "EXAMINING EFFECT" is set in the re-execution indication field 54, the information set in the field 54 is changed to "INDIRECT RE-EXECUTION", indicating that a job relevant to the entry is an indirect re-execution job (step 1332). Then, processing beginning from step 1308 is executed on the entry pointed to by P2 in the same manner as explained with reference to FIG. 12. When REN2 is "0" in step 1302, at step 1334, it is determined whether RJN is "0" or not. If RJN is not "0", then the process returns to step 1300, and this processing is repeated until a re-execution job cannot be found.

FIG. 15 shows the status of respective tables after execution of the processing shown in FIG. 14. A specific example of the above described processing will be explained with reference to FIGS. 13–15. At step 1330, the entry 220 is discriminated as an entry, the re-execution field 54 of which is "EXAMINING EFFECT" (refer to FIG. 13). Thereafter, at step 1332, information that is set in the re-execution indication field 54 is changed from "EXAMINING EFFECT" to "INDIRECT RE-EXECUTION". At steps beginning from step 1310, as to a data-set operated on by job A that is relevant to the entry 220, details of the operation on the data-set determined from entries in the job—data-set table 40 are inspected. As a result of this inspection, it is known that data-set C1 has been operated on by job A and its operation class is identified as "INPUT" from an entry 200. Then, an entry 224 that indicates an operation on the data-set C1 being "OUTPUT" and that follows an entry 222 corresponding to the entry 200 is found. Then, referring to the job name field 65 of the entry 224, job C is recognized as an affected indirect re-execution job, and "EXAMINING EFFECT" is set in the re-execution indication field 54 of an entry 226 that is relevant to job C. At this time, since RJN becomes "1", the effect of a job that is relevant to an entry with the re-execution indication field 54 to which "EXAMINING EFFECT" is set, is further inspected. As a result, information set in the re-execution indication field 54 of the entry 226 is changed from "EXAMINING EFFECT" to "INDIRECT RE-EXECUTION", and details of the operation as to the data-set operated on by job C is inspected. It is known, on the basis of information in the entries 230, 232, and 234, that data-set B1 has been operated on by job C and its operation class is "INPUT", and that data-set B1 was outputted by job B and has been deleted before the input operation by job C. Accordingly, job B is recognized as an affected indirect re-execution job, however it is known that job B has been identified as a direct re-execution job based on the entry 208 of the job information table 50. Therefore, job B is not applicable to an affected indirect re-execution job. Thus, job A and job C are identified as indirect re-execution jobs, and "INDIRECT RE-EXECUTION" is set in the re-execution indication fields 54 of the entries 220 and 226.

Figure 16:
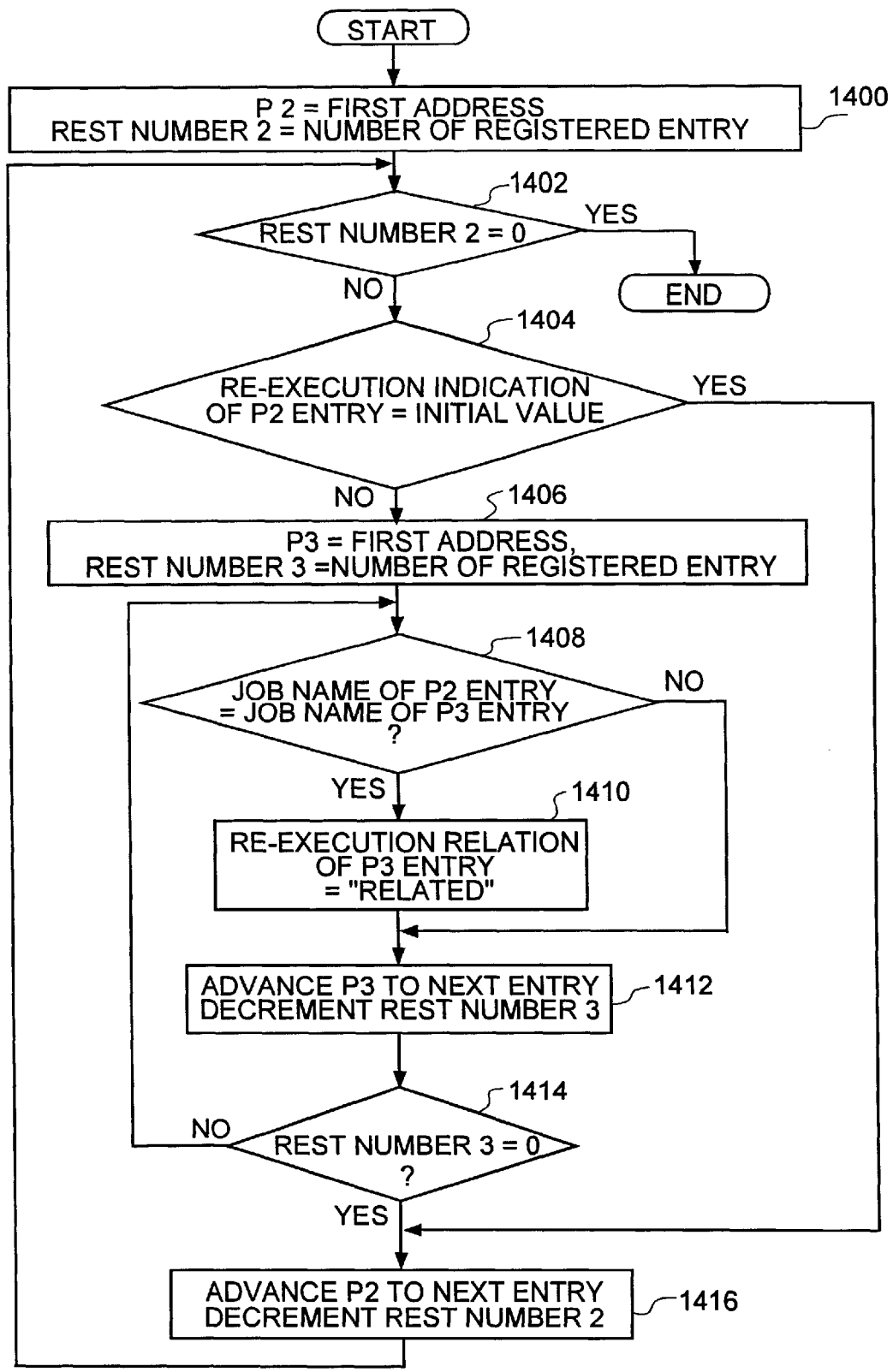
FIG. 16 is a detailed flow chart of a re-execution relation correcting processing.

FIG. 16 is a detailed flow chart of the re-execution relation correcting processing executed at step 140 of FIG. 7. In this processing, to begin with, an address of the first entry of the job information table 50 is set to P2, and the number of the registered entries of the job information table 50 is set to variable REN2 (step 1400). The value of REN2 is examined next. If the value is "0", the re-execution relation correcting processing is terminated, and then the processing is moved to the processing for determining a restoration generation number (step 1402). If REN2 is not "0" at step 1402, the value of the re-execution indication field 54 of an entry pointed by P2 in the job information table 50 is inspected successively (step 1404). When the re-execution indication field 54 has an initial value, that is, when a job that is relevant to the entry pointed to by P2 is not identified as a re-execution job, the process is moved to step 1416. If it is recognized, in step 1404, that the value of the re-execution field 54 is not an initial value and a job that is relevant to the entry is identified as a direct re-execution job or indirect re-execution job (such a job is referred as re-execution job hereafter), the following processing is executed to register all data-sets, operated on by the re-execution job, in the data-set operation table 60 as data-sets related to re-execution.

At step 1406, an address of the first entry of the data-set operation table 60 is set to P3 and the number of the entries registered in the data-set table 60 is set to a variable REST NUMBER 3 (REN3). At step 1408, a job name set in the job name field 51 of an entry pointed to by P2 in the job information table 50 is compared with a job name set in the job name field 65 of an entry pointed to by P3 in the data-set operation table 60. If these job names coincide, in order to indicate that the operation on the data-set which is relevant to the entry pointed to by P3 is related to re-execution, "RELATED" is set in the re-execution relation indication field 70 of the entry pointed to by P3 (step 1410). After step 1410, or in case it is distinguished that the job names do not coincide in step 1408, P3 is advanced one entry and REN3 is decreased by one (step 1412). Then, it is determined whether REN3 has become zero, and all entries of the data-set operation table 60 are inspected (step 1414). If any entry which is not inspected exists, then processing on the data-set table 60 is repeated. If it is determined that all entries of the data-set operation table 60 have been inspected, the processing is moved to the processing of step 1416. At step 1416, P2 is advanced one entry and REN2 is decreased by one. Thereafter, processing returns to step 1402 so that processing as to the next entry of the job information table 50 will be executed. According to above described processing, the designation "DIRECT RE-EXECUTION" or "INDIRECT RE-EXECUTION" is set to the re-execution indication field 54 of the job information table 50 and information indicating a relation to re-execution can be set as to data-set operated on by jobs designated as re-execution jobs.

Figure 17:
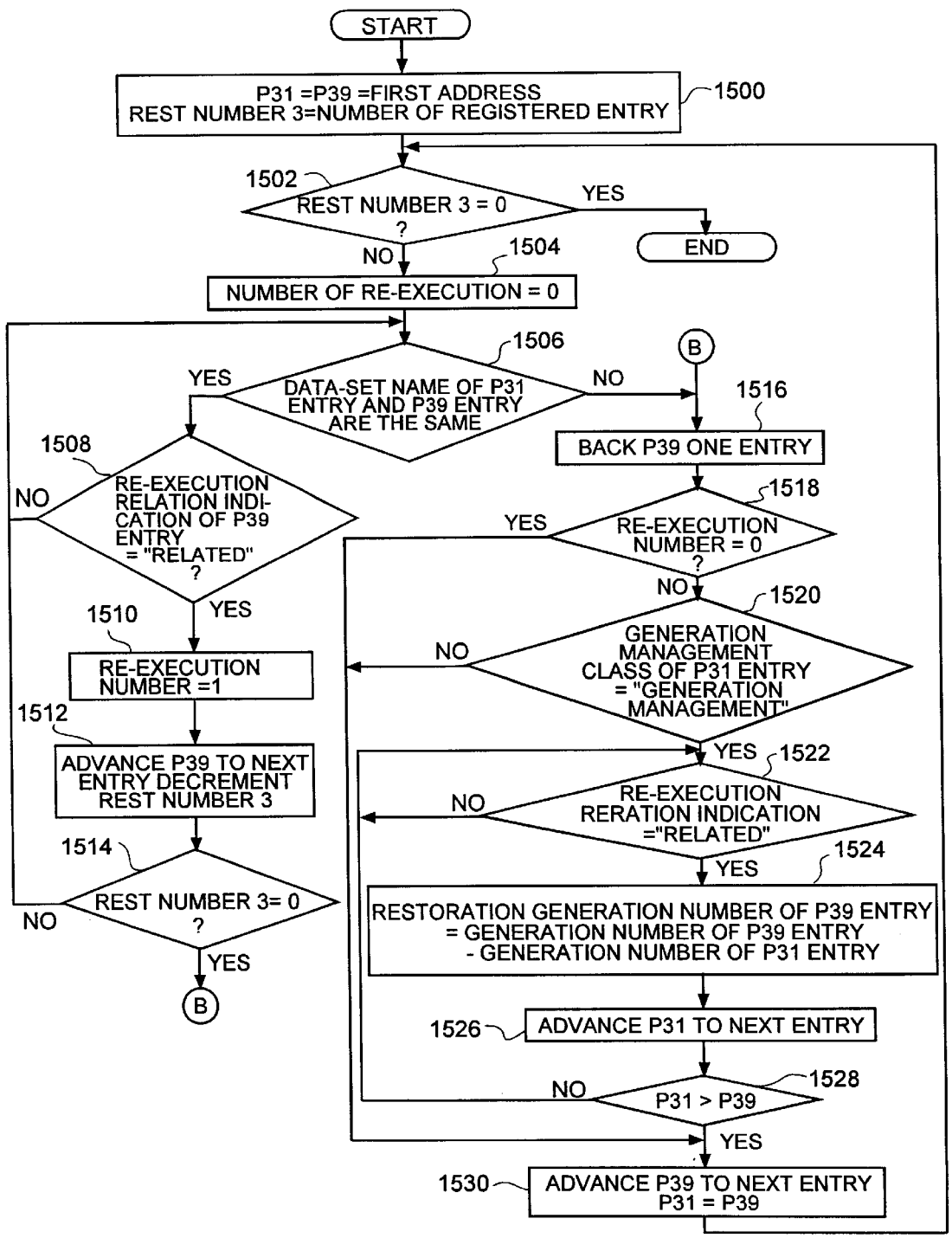
FIG. 17 is a detailed flow chart of processing for determining a restoration generation number.

FIG. 17 is a detailed flow chart of the processing for determining a restoration generation number executed at step 150. To begin with, in this processing, an address of the first entry of the data-set operation table 60 is set to variables P31 and P39 as an initial value, and the number of the entries registered in the data-set table 60 is set to variable REN3. The variable P39 is also used as a pointer to point to an entry of the data-set operation table 60, similar to the variable P2. Here, P31 and P39 are used as pointers to point to a first entry and a last entry in the data-set operation table 60, respectively. Both of the entries pointed to by P31 and P39 are relevant to the same data-set (step 1500). At step 1502, the value of REN3 is examined. If REN3 is "0" and all entries of the data-set operation table have been inspected, this processing is terminated, and the processing is moved to the processing of step 160. If REN3 is not "0" and it is determined that this processing has not being completed, "0" is set to a variable NUMBER OF RE-EXECUTION (NR). The restoration generation number for each data-set managed in generation operated on by a re-execution job is determined in the succeeding processing.

At step 1506, it is determined whether entries pointed to by P31 and P39 are relevant to the same data-set. In other words, it is determined whether a job name set in the job name field 61 of an entry pointed to by P31 coincides with a job name set in the job name field 61 of an entry pointed to by P39. If both entries are relevant to the same data-set, as to the relevant data-set, it is determined whether re-execution of a job has been determined. For this determination, the re-execution indication field 70 of the entry pointed to by P39 is inspected. If "RELATED" is set in the re-execution indication field 70, then "1" is set to NR and the processing is moved to step 1512, and, if not, the processing is moved to step 1512 while preserving NR. In this embodiment, NR is used like a flag since it is enough that NR can indicate whether or not a data-set under inspection is related to a re-execution job. Therefore, "1" is set to NR in case a data-set under inspection is related to a re-execution job. At step 1512, P39 is advanced one entry, and REN3 is decreased by one. Then, the value of REN3 is examined at the succeeding step 1214. If the value of REN3 is not "0", the processing is moved to step 1506.

If it is recognized that entries pointed to by P31 and P39 are not relevant to the same data-set at step 1506, or if it is recognized that REN3 is not "0" in step 1514, a determination of the relation to a re-execution job is completed as to a relevant data-set (that is relevant to the entry pointed to by P31 at the time of the determination). Then, a restoration generation number is selected for each operation on the relevant data-set managed in generation in accordance with the following processing. First, P39 is backed one entry to point to the last entry which is relevant to the data-set that is an object of the processing (step 1516), and then, the value of NR is examined (step 1518). In the case where NR is "0", the data set which is the object of the processing is not related to re-execution and it is not necessary to determine a restoration generation number even if the data-set is managed in generation. Therefore, the succeeding processing is skipped, and the processing is moved to step 1530. When the data-set is related to a re-examination job, by referring to the generation management class field 62 of an entry pointed to by P31, it is determined whether the data-set is managed in generation (step 1520). If the data-set is not managed in generation, since it is not necessary to designate a restoration generation number, the following steps are skipped, and the processing is moved to step 1530. If the data-set is managed in generation, the processing of steps 1522–1528 is executed to designate a restoration generation number.

At step 1522, the re-execution relation field 70 of the entry pointed to by P31 is examined. When the field does not designate "RELATED", step 1524 is skipped, since it is not necessary to designate a restoration generation number. If "RELATED" is set in the re-execution relation field 70, at step 1524, a generation number set in the generation number field 63 of the entry pointed to by P31, subtracted from a generation number set in the generation number field 63 of the entry pointed to by P39 designated as a restoration generation number concerned with the entry pointed to by P31. Here, the generation (number) set in the generation number field 63 of the entry pointed to by P39 is a final generation of the data-set. After that, P31 is advanced one entry to designate a restoration generation number concerned with the next entry (step 1526). Then, a comparison is made between P31 and P39. If P31 exceeds P39, determination of a restoration generation number for a data-set which is an object of the processing is finished, and the processing is moved to step 1530, otherwise, processing is returned to step 1522 to designate a restore generation number for the next entry. At step 1530, P39 is advanced one entry so that P39 can point to a first entry of the next data-set, and P31 is adjusted to P39, in order to execute processing on the rest of the data-sets. Then, processing is returned to step 1502.

Figure 18:
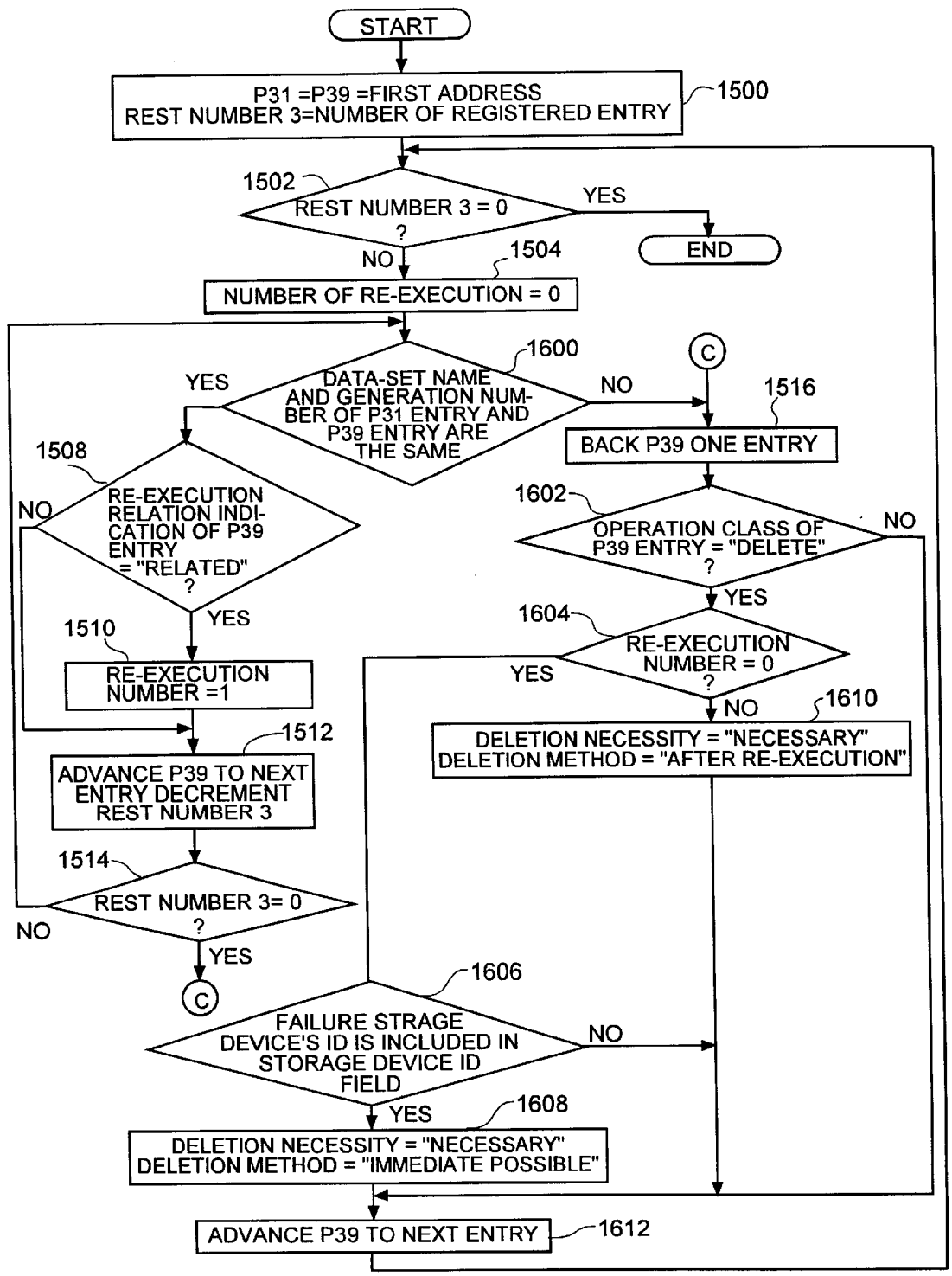
FIG. 18 is a detailed flow chart of processing for determining a deletion method.

FIG. 18 is a detailed flow chart of the processing for determining the deletion method executed in step 160. In FIG. 18, for the steps where processing is similar to the processing steps explained with reference to FIG. 17, the same reference numbers as FIG. 17 are used. In the following, an explanation of those steps has been omitted.

The steps 1500–1504 relates to an initialization processing like the processing explained with reference to FIG. 17. Thereafter, it is determined whether the value of the data-set name field 61 and the generation number field 63 of an entry pointed to by P31 coincide with those of an entry pointed to by P39. If coincidence is recognized, then the processing of steps 1508–1514 is executed to determine whether any re-execution job that relates to a data-set of the generation which is relevant to the entry under inspection exists. After inspection of the relation to a re-execution job is finished, P39 is backed one entry in step 1516. Thereafter, it is determined whether "DELETE" is set in the operation class field 64 of an entry pointed to by P39 in order to select a way to delete a relevant data-set (step 1602). In case the operation class field 64 does not indicate "DELETE", it is not necessary to delete the relevant data-set, and the processing is moved to the processing of step 1612. If "DELETE" is set in the operation class field 64, then the value of NR is examined to determine the existence of a re-execution job relating to the data-set which is relevant to the entry under processing (step 1604). If NR is "0", then it is determined whether any storage device ID of a failed storage device is stored in the storage device ID field 69. In case no storage device ID of a failed storage device is in the storage device ID field 69, deletion is not necessary, and the processing is moved to the processing of step 1612 from step 1606. On the other hand, if a storage device ID of a failed storage device is set, the designation "NECESSARY" is set in the deletion necessity field 71 of the entry pointed to by P39 and the designation "IMMEDIATELY" is set to the deletion method field 72 to indicate that a relevant data-set can be deleted immediately because it is supposed that the data-set which has been finally deleted in the executed batch job can be restored from backup. In case NR is not "0" at step 1604, since a relevant data-set that would be operated on in re-execution processing has been finally deleted in the executed batch job, the designation "NECESSARY" is set to the deletion necessity field 71 and the designation "AFTER" is set to the deletion method field 72, and then processing is moved to step 1612. At step 1612, in order to execute the processing for the rest of the entries, P39 is advanced one entry to point to a first entry which is related to the next data-set and P31 is adjusted to P39. Thereafter, the processing is moved to step 1502.

Figure 19:
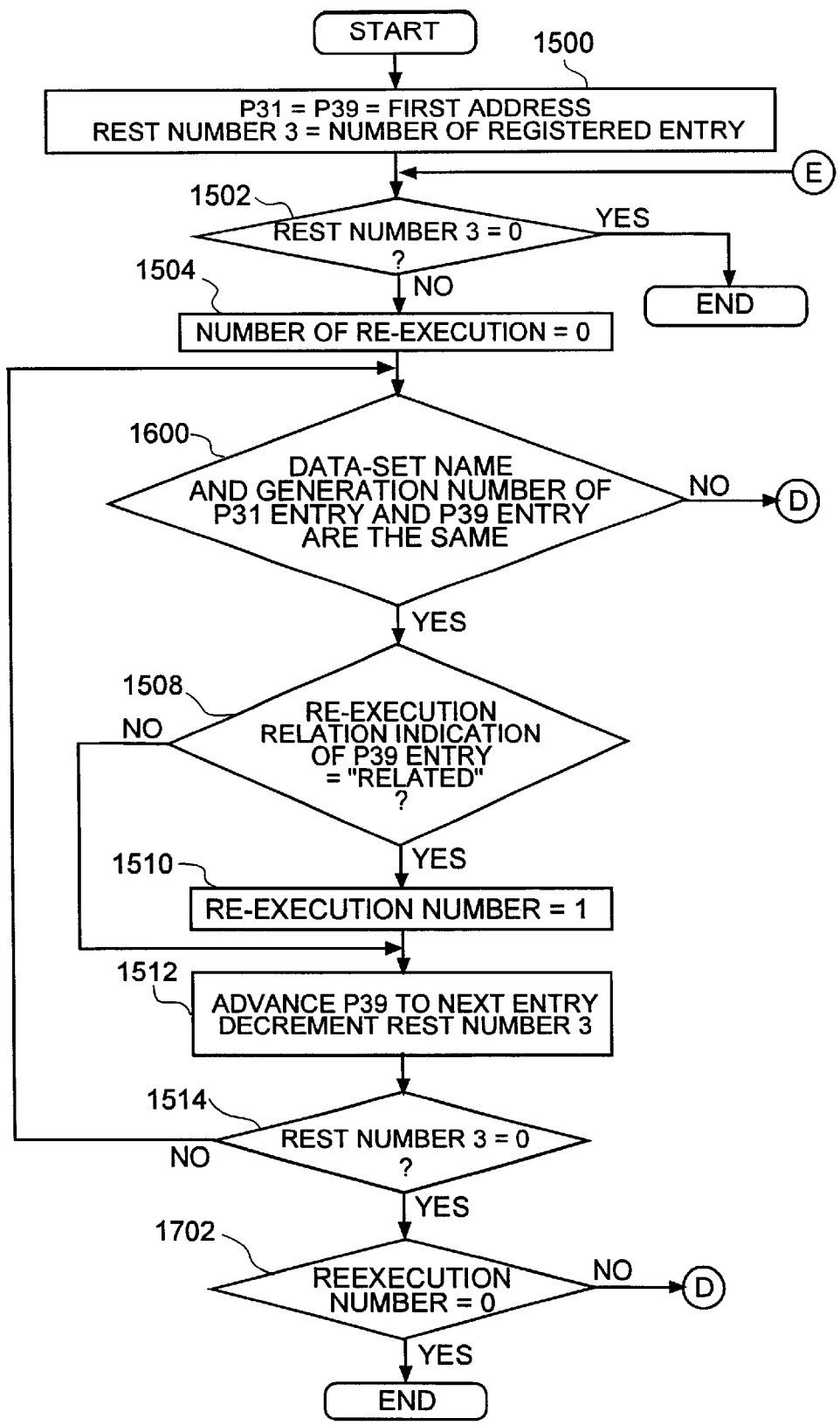
FIG. 19 is a detailed flow chart of processing for determining a necessity for restoration.
Figure 20:
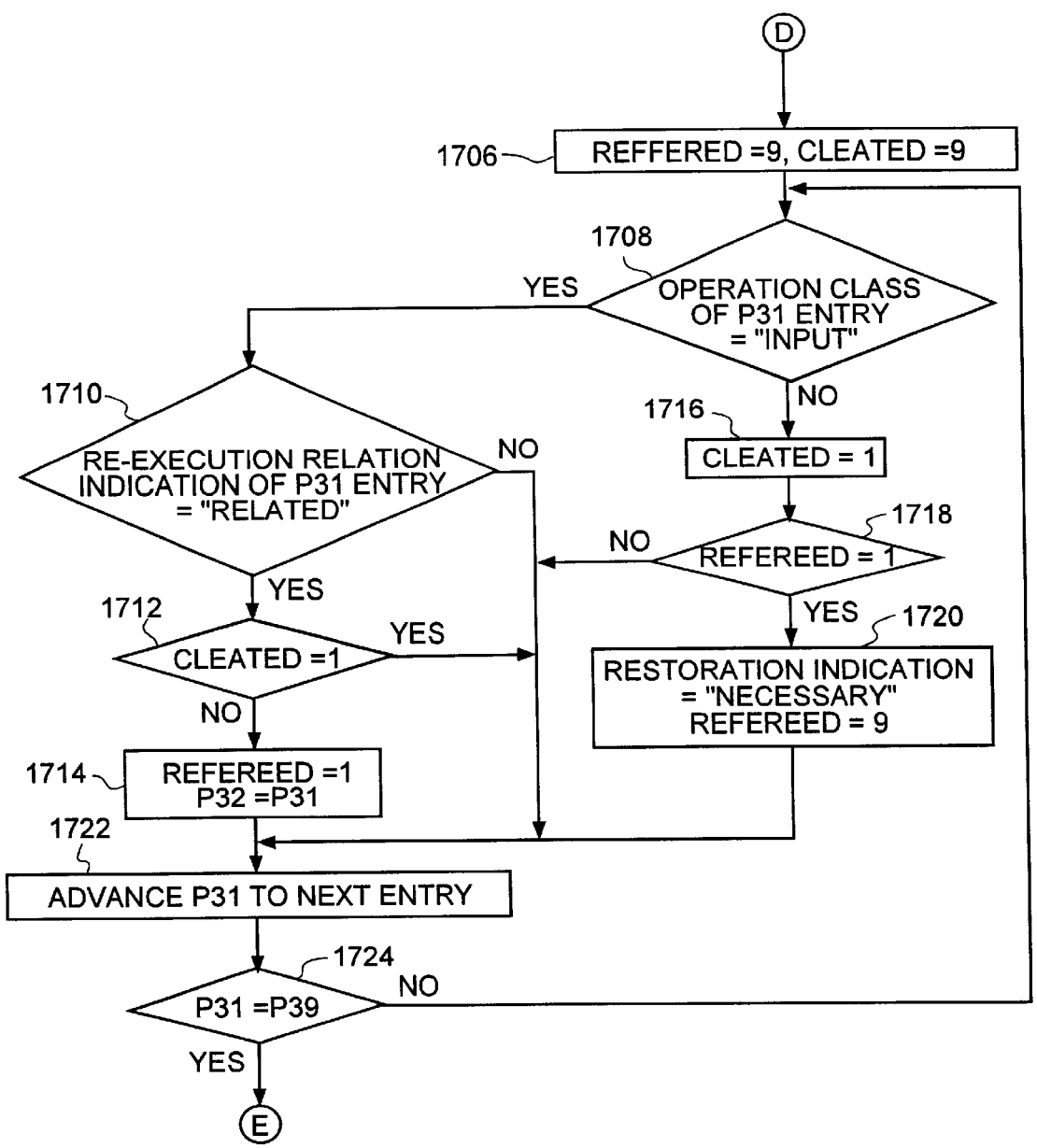
FIG. 20 is a detailed flow chart of processing for determining a necessity for restoration.

FIGS. 19 and 20 are detailed flow charts of the processing for determining the need for restoration executed at step 170. The steps 1500–1514 of FIG. 18 are also executed in the same way in this processing so the same reference numbers are used for corresponding steps in this figure and a detailed explanation of those steps is omitted here.

In the restoration necessity decision processing, when REN3 is "0" in step 1514, then the value of NR is examined. If the value of NR is "0", this processing is finished, and the processing is moved to step 180 (step 1702). When NR is not "0" at step 1702, and the data-set name field 61 and the generation number field 63 of the entry pointed to by P31 do not coincide with that of an entry pointed to by P39 in step 1600, the processing is moved to processing beginning from step 1706. In the processing beginning from step 1706, for a data-set, on which an input operation has been performed by a job designated as a re-execution job, but no deletion and output operation has been performed before the input operation, and an output operation or deletion operation has been performed after the input operation, is designated as a data-set that should be individually restored from backup.

At step 1706, as initial conditions for the following processing, as to a data-set that is relevant to the entry under inspection, "9" is set to a variable REFERRED (RE) to indicate a status that no entry relating to an input operation to the data-set by a re-execution job has been found, and also "9" is set to a variable CREATED (CR) to indicate that no entry relating to an output or deletion operation on the data-set has been found. Then, it is determined whether or not the designation "INPUT" is set in the operation class field 64 of an entry pointed to by P31 (step 1708). If "INPUT" is set in the operation class field 64, the re-execution relation field 70 of the entry pointed to by P31 is examined (step 1710). If "RELATED" is set in the operation class field 64, the value of CR is examined (step 1712). If the value of CR is "1" and the existence of an output or deletion operation on the data-set executed before the input operation by a re-execution job is indicated, processing is moved to step 1722. If the value of CR is kept at "9" and it is indicated that neither an input nor an output operation on the data-set has been performed before the input operation by a re-execution job, it is necessary to inspect whether a deletion or output operation on the data-set was executed after the input operation which is relevant to the entry. Therefore, "1" is set to RE in order to indicate that an entry relating to an input operation on the data-set has been found. Also, to preserve the pointer that points to the entry, the address set in P31 is copied to P32 (step 1714). Thereafter, P31 is advanced one entry (step 1722), and it is determined whether the value of P31 coincides with the value of P39 (step 1724). If both values do not coincide, the processing is returned to step 1708 to continue the processing on the data-set. On the other hand, if both values coincide, the processing is moved to step 1502 to execute the processing on the next data-set. If the designation "RELATED" is not set in the re-execution indication field 70 of the entry pointed to by P31 as a result of examination in step 1710, or if CR is not "1" in step 1712, the processing is moved to step 1722. On the other hand, when operation class field 64 of the entry pointed to by P31 does not have the designation "INPUT" at step 1708, "1" is set to CR to indicate that an entry relating to output or deletion operation as to the data-set which is an object of the processing exists (step 1716). Then the value of RE is examined (step 1718). If RE is "1", it means that neither an output nor a deletion operation has been performed before the input operation which is relevant to the entry pointed to by P32, but an output or deletion operation has been performed after the input operation. Therefore, in this case, the data-set that is an object of an input operation which is relevant to the entry pointed to by P32 should be restored from backup individually in order to restore the status of the data-set at the time the input operation was executed. To indicate this, the designation "NECESSARY" is set in the restoration indication field 74 of the entry pointed to by P32. Here, the initial value "9" is set to RE again in order to determine whether the same phenomenon has occurred after a data-set operation of the entry pointed to by P32 (step 1720). If it is recognized that RE is not "1" in step 1718, an input operation followed by an output or deletion operation did not exist, and so the processing is moved to step 1722.

FIG. 21 shows an example of the status of the data-set operation table 60 after the processing for determining the need for restoration. The entry 300, for example, indicates that data-set operation which is relevant to the entry 300 relates to re-execution and it is necessary to change the relative generation number defined in JCL of a job B as "+1" to "+0". The entry 302 indicates that the relevant data-set A2 can be deleted after re-execution. The entry 304 indicates that it is required to restore data-set X from backup individually.

FIG. 22 shows examples of document formats of the re-execution job list 11, the generation information correcting list 12, the restoration data-set list 13, and the deletion data-set list 14. These documents are edited in step 180, on the basis of information set in the tables, and are outputted in step 190 as documents. The failed storage device information that is an output item common to respective documents is edited based on the storage device ID stored in the failed storage device ID table. The standard date is edited based on a created date and time of the acquisition of the first record and last records of the transition history information.

The re-execution job list 11 is edited after sorting the job information table 50 in ascending order of the job starting times. Information used for editing is set in each entry of a re-execution indication field 54 which has information other than the initial value. That is, entries with a re-execution indication field 54 having the designation "DIRECT RE-EXECUTION" or "INDIRECT RE-EXECUTION" are used for editing. The order of re-execution of jobs is the order of the starting time set in the job starting time field 52. The required time is obtained from the time difference between the time set in the job starting time field 52 and the job ending time field 53. The total required time indicates total execution time from the beginning of the first re-execution job and is obtained as the sum of the required times of the respective jobs. An operator can recover the contents of failed storage devices to the status before failure occurred by re-executing jobs in accordance with these documents. The total required time can be used for estimating the required time for recovery.

The generation information correcting list 12 is edited after sorting the data-set operation table 60 in ascending order of the job names. Information used for editing is set in entries with a restoration generation number field 73 having a value other than the initial value. The generation information correcting list 12 is used for revising the generation of a data-set defined in the JCL of the re-execution jobs prior to re-execution.

The restoration data-set list 13 is edited after sorting the data-set operation table 60 in the ascending order of the data-set names and generation numbers. Information used for editing is information set in entries with a restoration indication field 74 having a value other than the initial value. This document is used for restoring a data-set from backup individually prior to the re-execution of jobs.

The deletion data-set list 14 is edited with sorting of the data-set operation table 60 in the ascending order of the deletion method, data-set names, and generation numbers. Information used for editing is information of the entries with a deletion necessity field 71 having the designation "NECESSITY". When restoration processing for restoring a data-set from a storage device is executed, a data-set that has the designation "IMMEDIATELY" in the column of the deletion method can be deleted before re-execution. While, a data-set that has the designation "AFTER RE-EXECUTION" in the column of deletion method would be deleted after re-execution.

FIG. 23 shows an example of a document format of the re-execution job—data-set operation list 15. The re-execution job—data-set operation list 15 is edited on the basis of information relating to a re-execution job in the job—data-set table 40, and then it is outputted in a document form in step 90.

FIG. 24 shows an example of the document format of the data-set operation list 16. The data-set operation list 60 is edited based on information set in the job information table 60 in step 180 and is outputted in a document form in step 190. Marks "○" and "☆" attached to job names are an indication of direct re-execution job and an indirect re-execution job, respectively.

According to the above described embodiment, information, such as information on a required procedure to recover from a storage device failure, can be obtained easily in a short time. Therefore, recovery from a failure of a storage device can be achieved easily regardless of the number of executed jobs. In addition, information used for recovery is generated from transition history information obtained during execution of a batch job; therefore, it can be applied without further resources or an increase in the processing overhead.

The invention may be embodied in other specific forms without departing from the spirit or essential characteristics thereof. The present embodiment is therefore to be considered in all respects as illustrative and not restrictive, the scope of the invention being indicated by the appended claims, rather than by the foregoing description, and all changes which come within the meaning and range of equivalency of the claims are therefore intended to be embraced therein.

What is claimed is:

1. A method for supporting recovery processing from a failure of a storage device in a computer system including a processing unit and a storage device, wherein a batch job consisting of a plurality of jobs is executed on said processing unit, said method comprising the steps of:

a direct re-execution job extracting step of inspecting, as to each job that has been executed in an executed batch job, an operation on a data-set that has been performed by a job under inspection and the operation type thereof, on the basis of transition history information that has been obtained during execution of said executed batch job and includes information relating to executed jobs and operated on data-sets, and a designation of a storage device ID, and extracting a job to be executed in re-execution processing as a direct re-execution job on the basis of a result of the inspecting;

an indirect re-execution job extracting step of inspecting, as to each data-set that has been operated on by a job extracted as said direct re-execution job, the operation type of the operation that has been performed by said job extracted as said direct re-execution job and by a job other than said job extracted as said direct re-execution job, and extracting a job, the execution of which is necessary for executing said job extracted as said direct re-execution job, as an indirect re-execution job on the basis of a result of the inspecting;

a restoration generation number determining step for determining a restoration generation number representing how many generations should be considered for a data-set in a respective operation that has been performed by a job extracted as said direct re-execution job or said indirect re-execution job based on a final generation of the data-set and a generation at the time of said respective operation of the data-set, if the data-set is managed in generation;

a deletion method determining step of inspecting, as to each data-set that has been finally deleted in said executed batch job, whether the data-set has been operated on by at least one of a job extracted as said direct re-execution job and a job extracted as said indirect re-execution job, and whether the data-set is stored in a storage device identified by said storage device ID, and determining a way of and a timing for deletion of the data-set on the basis of a result of the inspecting;

a restoration data-set determining step of inspecting, as to each data-set that has been operated on by at least one of a job extracted as said direct re-execution job and a job extracted as said indirect re-execution job, an operation history of the data-set, and designating a data-set to be restored from backup individually; and outputting information that is required to restore a failed storage device on the basis of results of the above respective steps.

2. A method according to claim 1, further comprising the step of creating a job—data-set table storing information relating to a data-set operation that has been performed in respective jobs in said executed batch job, a job information table storing information relating to execution of said jobs that has been executed in said executed batch job, a data-set operation table storing information relating to respective data-set operations that have been performed in said jobs, and wherein said direct re-execution job extracting step, said indirect re-execution job extracting step, said restoration generation number determining step, said deletion method determining step, and said restoration data-set determining step are executed using information in at least one of said job—data-set table, said job information table, and said data-set operation table.

3. A method according to claim 1, wherein said direct re-execution job extracting step includes a step of extracting, as said direct re-execution job, a job that has performed an output operation to a relevant data-set, which has been outputted to a storage device identified by said designated storage device ID and which has not been deleted by any job succeeding the job that has performed said output operation.

4. A method according to claim 1, wherein said indirect re-execution job extracting step inspects, as to each data-set to which an input operation has been performed by said job extracted as said direct re-execution job, an operation type of operation to a data-set having the same data-set name and the same generation as the data-set under inspection.

5. A method according to claim 1, wherein said extracting of said indirect re-execution job extracting step includes at least one of the steps of:

extracting, as said indirect re-execution job, a job that has performed an output operation on the data-set having the same name and the same generation lastly before said input operation if any output operation on the data-set having the same name and the same generation has been performed before said input operation and if a deletion operation on the data-set having the same name and the same generation has been performed after the input operation;

extracting, as said indirect re-execution job, a job that has performed an output operation on the data-set having the same name and the same generation lastly before said input operation, and a job that has performed the last output operation on the data-set having the same name and the same generation which has not been deleted, if output operations on the data-set having the same name and the same generation have been performed before and after said input operation; and extracting, as said indirect re-execution job, a job that has performed the last output operation on the data-set having the same name and the same generation, if no output operation has been performed on the data-set having the same name and the same generation before said input operation, if any output operation has been performed on the data-set having the same name and the same generation after said input operation, and if the data-set having the same name and the same generation has not been deleted.

6. A method according to claim 1, wherein said indirect re-execution job extracting step inspects, as to a data-set on which an output operation has been performed by said job extracted as said direct re-execution job, an operation type of each operation having been performed after said output operation on a data-set having the same data-set name and the same generation with a data-set under inspection, and wherein said indirect re-execution job extracts a job that has performed the last output operation on the data-set, if any output operation has been performed on the data-set having the same name and the same generation after said output operation, and if the data-set having the same name and the same generation has not been deleted.

7. A method according to claim 1, wherein said inspecting of said indirect re-execution job extracting step is repeated as to a data-set that has been operated on by a job extracted as said indirect re-execution job.

8. A method according to claim 1, wherein said restoration generation number determining step includes a step of obtaining, for respective operations on a data-set that has been operated on by a job extracted as said direct re-execution job or said indirect re-execution job, a difference between a final generation of the data-set and a generation at the time that the operation was performed.

9. A method according to claim 1, wherein said deletion method determining step includes a step of determining a data-set that has not been operated by a job designated as said direct re-execution job or said indirect re-execution job, that has been outputted into a failed storage device and that has been finally deleted as a data-set that can be deleted immediately, and a step of determining a data-set that has been operated on by a data set extracted as said direct re-execution job or said indirect re-execution job and that has been finally deleted as a data-set that can be deleted after re-execution.

10. A method according to claim 1, wherein said restoration data-set determining step includes a step of inspecting an operation type of respective operations in every generation of each data-set, and a step of determining a data-set on which an input operation has been performed by a job extracted as said direct re-execution job or said indirect re-execution job as a data-set to be restored if neither an output operation nor a deletion operation has been performed on the data-set and if at least one of an output and a deletion operation has been performed on the data-set after said input operation.

11. A computer-readable medium having computer-executable instructions, which are executed to support recovery processing from a failure of a storage device in a computer system, in which a batch job consisting of a plurality of jobs is executed on a processing unit, for performing the following steps of:

a direct re-execution job extracting step of inspecting, as to each job that has been executed in an executed batch job, an operation on a data-set that has been performed by a job under inspection and the operation type thereof, on the basis of transition history information that has been obtained during execution of said executed batch job and includes information relating to executed jobs and operated on data-sets, and a designation of a storage device ID, and extracting a job to be executed in re-execution processing as a direct re-execution job on the basis of a result of the inspecting;

an indirect re-execution job extracting step of inspecting, as to each data-set that has been operated on by a job extracted as said direct re-execution job, the operation type of the operation that has been performed by said job extracted as said direct re-execution job and by a job other than said job extracted as said direct re-execution job, and extracting a job, the execution of which is necessary for executing said job extracted as said direct re-execution job, as an indirect re-execution job on the basis of a result of the inspecting;

a restoration generation number determining step for determining a restoration generation number representing how many generations should be considered for a data-set in a respective operation that has been performed by a job extracted as said direct re-execution job or said indirect re-execution job based on a final generation of the data-set and a generation at the time of said respective operation of the data-set, if the data-set is managed in generation;

a deletion method determining step of inspecting, as to each data-set that has been finally deleted in said executed batch job, whether the data-set has been operated on by at least one of a job extracted as said direct re-execution job and a job extracted as said indirect re-execution job, and whether the data-set is stored in a storage device identified by said storage device ID, and determining a way of and a timing for deletion of the data-set on the basis of a result of the inspecting;

a restoration data-set determining step of inspecting, as to each data-set that has been operated on by at least one of a job extracted as said direct re-execution job and a job extracted as said indirect re-execution job, an operation history of the data-set, and designating a data-set to be restored from backup individually; and outputting information that is required to restore a failed storage device on the basis of results of the above respective steps.

* * * * *